United States Patent
Decker et al.

(10) Patent No.: US 9,477,642 B2
(45) Date of Patent: Oct. 25, 2016

(54) GESTURE-BASED NAVIGATION AMONG CONTENT ITEMS

(71) Applicant: Apple Inc., Cupertino, CA (US)

(72) Inventors: Kevin W. Decker, San Jose, CA (US); Nicholas Zambetti, San Francisco, CA (US); Jeffrey Traer Bernstein, San Francisco, CA (US); Raymond Sepulveda, San Jose, CA (US); Duncan R. Kerr, San Francisco, CA (US); Julian Missig, Redwood City, CA (US); Donald Melton, San Carlos, CA (US)

(73) Assignee: APPLE INC., Cupertino, CA (US)

(*) Notice: Subject to any disclaimer, the term of this patent is extended or adjusted under 35 U.S.C. 154(b) by 222 days.

(21) Appl. No.: 13/750,572

(22) Filed: Jan. 25, 2013

(65) Prior Publication Data
US 2013/0205244 A1  Aug. 8, 2013

Related U.S. Application Data

(60) Provisional application No. 61/595,114, filed on Feb. 5, 2012.

(51) Int. Cl.
*G06F 17/21* (2006.01)
*G06F 3/01* (2006.01)
*G06F 17/30* (2006.01)

(52) U.S. Cl.
CPC .............. *G06F 17/21* (2013.01); *G06F 3/017* (2013.01); *G06F 17/30905* (2013.01)

(58) Field of Classification Search
CPC .............................. G06F 3/0485; G06F 3/048
USPC ....................................................... 715/784
See application file for complete search history.

(56) References Cited

U.S. PATENT DOCUMENTS

| 8,762,878 B1* | 6/2014 | Weber ............... G06F 3/0483 715/777 |
| 2004/0261035 A1* | 12/2004 | Emerson ............ G06F 3/0483 715/777 |

(Continued)

FOREIGN PATENT DOCUMENTS

| JP | 2006146824 A | 6/2006 |
| JP | 2007233797 A | 9/2007 |

(Continued)

OTHER PUBLICATIONS

International Preliminary Report on Patentability for PCT Patent Application No. PCT/US2013/023634, mailed Aug. 14, 2014, 6 pages.

(Continued)

*Primary Examiner* — Angie Badawi
(74) *Attorney, Agent, or Firm* — Morgan, Lewis & Bockius LLP

(57) ABSTRACT

In any context where a user can view multiple different content items, switching among content items is provided using an array mode. In a full-frame mode, one content item is visible and active, but other content items may also be open. In response to user input the display can be switched to an array mode, in which all of the content items are visible in a scrollable array. Selecting a content item in array mode can result in the display returning to the full-frame mode, with the selected content item becoming visible and active. Smoothly animated transitions between the full-frame and array modes and a gesture-based interface for controlling the transitions can also be provided.

15 Claims, 34 Drawing Sheets

(56) References Cited

U.S. PATENT DOCUMENTS

| | | | |
|---|---|---|---|
| 2006/0230356 A1* | 10/2006 | Sauve | G06F 3/0481 715/777 |
| 2006/0238520 A1 | 10/2006 | Westerman et al. | |
| 2006/0265417 A1 | 11/2006 | Amato et al. | |
| 2007/0152984 A1 | 7/2007 | Ording et al. | |
| 2007/0204232 A1 | 8/2007 | Ray et al. | |
| 2008/0165255 A1 | 7/2008 | Christie et al. | |
| 2009/0225038 A1 | 9/2009 | Bolsinga et al. | |
| 2010/0180225 A1* | 7/2010 | Chiba | G06F 3/0481 715/777 |
| 2010/0283743 A1 | 11/2010 | Coddington | |
| 2011/0013049 A1* | 1/2011 | Thorn | 348/240.3 |
| 2011/0090255 A1 | 4/2011 | Wilson et al. | |
| 2011/0138313 A1 | 6/2011 | Decker et al. | |
| 2011/0163968 A1* | 7/2011 | Hogan | 345/173 |
| 2011/0163969 A1 | 7/2011 | Anzures et al. | |
| 2011/0163971 A1 | 7/2011 | Wagner et al. | |
| 2012/0032877 A1* | 2/2012 | Watkins et al. | 345/156 |
| 2013/0067420 A1* | 3/2013 | Pittappilly et al. | 715/863 |
| 2013/0120444 A1 | 5/2013 | Allyn et al. | |
| 2013/0205194 A1 | 8/2013 | Decker et al. | |
| 2013/0205244 A1 | 8/2013 | Decker et al. | |
| 2014/0298240 A1* | 10/2014 | Jitkoff et al. | 715/777 |

FOREIGN PATENT DOCUMENTS

| | | |
|---|---|---|
| JP | 2008536217 A | 9/2008 |
| JP | 2011018098 A | 2/2011 |
| KR | 10-0733962 | 6/2007 |
| KR | 10-2009-0053851 | 5/2009 |
| TW | 200406687 | 5/2004 |
| TW | 200743971 | 12/2007 |

OTHER PUBLICATIONS

International Search Report and Written Opinion for PCT Patent Application No. PCT/US2013/023634, mailed Jul. 12, 2013, 9 pages.

Notice of Allowance, dated Sep. 2, 2015, received in Taiwanese Patent Application No. 102104256, which corresponds with U.S. Appl. No. 13/750,572, 6 pages.

Office Action, dated Jul. 16, 2015, received in Australian Patent Application No. 2013215357, which corresponds with U.S. Appl. No. 13/750,572, 3 pages.

Office Action, dated Aug. 18, 2015, received in Korean Patent Application No. KR 10-2014-7025056, which corresponds with U.S. Appl. No. 13/750,572, 4 pages.

Office Action, dated Apr. 21, 2015, received in Taiwanese Patent Application No. 102104256, which corresponds with U.S. Appl. No. 13/750,572, 6 pages.

Office Action, U.S. Appl. No. 13/750,586, Mar. 27, 2015, 14 pgs.

Office Action, dated Nov. 24, 2015, received in Japanese Patent Application No. 2014-555623, which corresponds with U.S. Appl. No. 13/750,572, 11 pages.

Office Action, dated Apr. 1, 2016, received in Korean Patent Application No. KR 10-2014-7025056, which corresponds with U.S. Appl. No. 13/750,572, 5 pages.

Patent, dated Jan. 11, 2016, received in Taiwanese Patent Application No. 102104256, which corresponds with U.S. Appl. No. 13/750,572, 2 pages.

Final Office Action, dated Dec. 18, 2015, received in U.S. Appl. No. 13/750,586, 10 pages.

\* cited by examiner

GESTURE-BASED NAVIGATION AMONG CONTENT ITEMS

CROSS-REFERENCE TO RELATED APPLICATIONS

This application claims the benefit of U.S. Provisional Application No. 61/595,114, filed Feb. 5, 2012, entitled "Navigating Among Content Items in a Browser Using an Array Mode," the disclosure of which is incorporated by reference herein in its entirety.

This application is also related to commonly-owned co-pending U.S. application Ser. No. 13/750,586, filed Jan. 25, 2013, the disclosure of which is incorporated by reference herein in its entirety.

BACKGROUND

The present disclosure relates generally to content browsers for use in computer systems and in particular to navigating among content items in a browser using an array mode.

Content browsers are found on many types of computer systems, from desktops to tablets to handhelds. Usually implemented as software, a browser enables a user to view and interact with content items. For example, in the case of the World Wide Web, a web browser allows a user to enter a uniform resource locator (URL) for a particular content item (often referred to in the web-browsing context as a web page) and view the item in a page-display area of the browser. The user can interact with the displayed web page, e.g., by activating hyperlinks embedded in the page and thereby navigating to a different page.

A number of existing web browsers support a mode that is frequently referred to as "tabbed" browsing. The browser maintains the URLs and/or actual content of multiple pages in association with various "tabs"; common usage in the art describes this state of affairs variously as having pages open in tabs or as tabs being open. The tabs themselves, which are usually rendered to look like the tabs on file folders, appear in a tab area of the browser, e.g., at the top of the page-display area. Each rendered tab contains a title, partial title, URL or other identifier for the page that is currently open in that tab. At any given time, one tab is the "active" tab; the page that is currently open in the active tab is rendered in the page-display area and is the active page. All user input is processed in the context of the active page. The user can change the current page for a tab. For example, if the user selects (e.g., clicks on) a hyperlink in the active page, the browser will typically replace the page with the linked-to page, which is typically opened in the currently active tab and becomes the current page for the active tab. Thus, each tab can have its own history of pages viewed in that tab.

The user can switch to a different tab by selecting (e.g., clicking on) any of the non-active tabs in the browser, whereupon the selected tab becomes the active tab, and the current page associated with that tab is rendered in the page-display area and becomes the active page for the browser. In connection with this transition, the tab area usually changes to indicate the new active tab. The user can also create a new tab or close an open tab by operating various controls provided in the browser's user interface. Thus, tabbed browsers may allow an arbitrary number of tabs to be open at any given time, with each tab having its own current page and page-view history.

Tabs provide a useful way to manage content, and users often find it convenient to maintain a large number of open tabs. However, as the number of open tabs increases, finding a particular page becomes a challenge. The page name or other label in the tab may be insufficient for the user to recognize the page she is seeking, and in some cases not all tabs may be visible due to the limited size of the browser relative to the number of tabs that may be open.

SUMMARY

Certain embodiments of the present invention provide improved navigation between open tabs (or other open content items). In any context where a user can view multiple different content items, such as a web browser or word processing program or the like, switching among open (or currently loaded) content items is provided using an array mode. In a full-frame mode, one content item is visible and active, but other content items may also be open. In response to user input the display can be switched to an array mode, in which all of the content items are viewable in a scrollable array. Selecting a content item in array mode can result in the display switching back to the full-frame mode, with the selected content item becoming visible and active. Smoothly animated transitions between the full-frame and array modes and a gesture-based interface for controlling the transitions can also be provided. Allowing the user to quickly see all of the open content items by scrolling through the array can assist the user in quickly finding a particular content item regardless of how many items are open at a given time.

Certain embodiments of the present invention relate to browsing among content items (including but not limited to web pages) that may be open in multiple tabs. In some embodiments, in addition to a full-frame mode that can be similar to existing tabbed browsers, the browser can also support an "array mode," in which the various content items that are open in different tabs are arranged in an array, at least part of which is visible in the browser's page-display area. The user can scroll through this array to view and select any of the open content items to become the active tab. When a content item is selected to become the open tab, the browser can switch to the full-frame mode to display the selected content item as the active item. Smoothly animated transitions between the full-frame and array modes can be provided, and these transitions can help the user understand the relationship between the modes. In some embodiments, a gesture-based user interface can be used to control the transitions between array mode and full-frame mode, e.g., in response to gestures made by a user on a touch-sensitive surface.

Certain embodiments also relate to using a touch-sensitive surface to change the user interface region of a display in a computer system. Initially, a first user interface region can be displayed at a first scale factor. A first gesture can be detected based on detecting movement of two or more contacts on the touch-sensitive surface relative to each other; for example, the contacts can move toward each other, and a second gesture can be detected based on movement of at least one of the contacts while that contact remains in contact with the touch-sensitive surface (that is, there is no lift-off between the first and second gestures). In response to detecting the first gesture, the computer system can display the first user interface region at a second scale factor lower than the first scale factor, and in response to detecting the second gesture, the computer system can display a portion of a different user interface region that was not previously displayed. The combination of the first and second gestures (while at least one contact remains continuously in contact with the touch-sensitive surface) can effect a transition from the first user interface region to the second user interface region.

The following detailed description together with the accompanying drawings will provide a better understanding of the nature and advantages of the present invention.

BRIEF DESCRIPTION OF THE DRAWINGS

FIG. 6 illustrates an early stage in the transition.

FIG. 7 illustrates a stage subsequent to FIG. 6.

FIG. 8 illustrates a stage subsequent to FIG. 7.

FIG. 9 illustrates the browser screen in array mode just prior to a transition to full-frame mode.

FIG. 10 illustrates a beginning stage of the transition.

FIG. 11 illustrates a stage subsequent to FIG. 10.

FIG. 12 illustrates a stage subsequent to FIG. 11.

FIG. 13 illustrates a stage subsequent to FIG. 12, near the end of the transition.

FIG. 14 illustrates an end stage of the transition.

FIG. 19 illustrates a browser screen in full-frame mode displaying an enlarged page.

FIG. 20 illustrates a browser screen with a temporarily shrunken page in full-frame mode.

FIG. 21 illustrates a browser screen with a page snapped back to full-frame mode.

FIG. 29 illustrates a browser screen in full-frame mode according to an embodiment of the present invention.

FIG. 30 illustrates a browser screen for an array mode corresponding to the full-frame mode of FIG. 29.

FIG. 31 illustrates a browser screen showing an effect of scrolling the array in FIG. 30.

FIG. 32 illustrates a browser screen showing an effect of scrolling the array in FIG. 30 to the right end.

FIG. 33 illustrates a browser screen showing an effect of scrolling the array in FIG. 30 to the left end.

It is noted that some of the drawings include illustrative content items, some of which may be include content produced or owned by third parties. The content is used solely to illustrate certain features of the invention, and it will be understood that the particular content items are not part of the invention.

DETAILED DESCRIPTION

Certain embodiments of the present invention relate to browsing among content items (including but not limited to web pages) that may be open in multiple tabs. (As used herein, an item can be "open," e.g., if a representation of it is loaded into memory of the relevant application.) In some embodiments, in addition to a full-frame mode that can be similar to existing tabbed browsers, the browser can also support an "array mode," in which the various content items that are open in different tabs are arranged in an array (e.g., a single strip), at least part of which is visible in the browser's page-display area. The user can scroll through this array to view and select any of the open content items to become the active tab. When a content item is selected to become the open tab, the browser can switch to the full-frame mode to display the selected content item as the active item. Smoothly animated transitions between the full-frame and array modes can be provided, and these transitions can help the user understand the relationship between the modes. In some embodiments, a gesture-based user interface can be used to control the transitions between array mode and full-frame mode, e.g., in response to gestures made by a user on a touch-sensitive surface.

Figure 1:
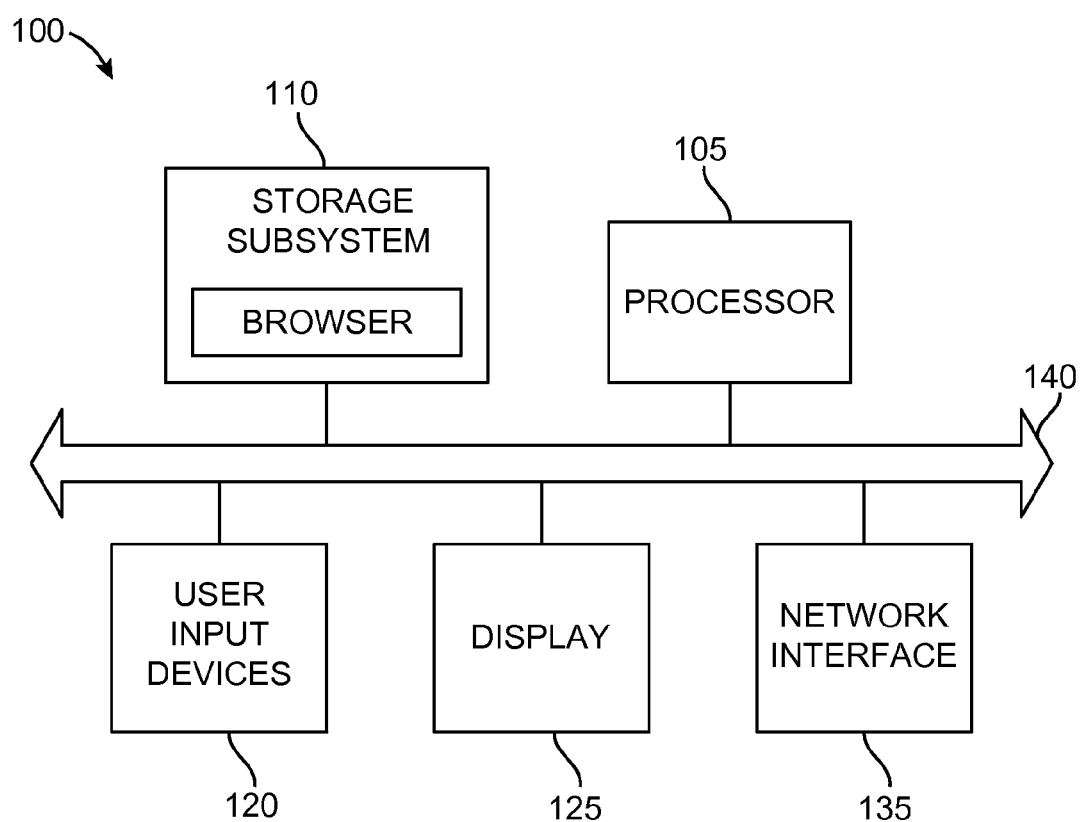
FIG. 1 is a block diagram of a computer system according to an embodiment of the present invention.

FIG. 1 illustrates a computer system 100 according to an embodiment of the present invention. Computer system 100 can be implemented as any of various computing devices, including, e.g., a desktop or laptop computer, tablet computer, smart phone, personal data assistant (PDA), or any other type of computing device, not limited to any particular form factor. Computer system 100 can include processing unit(s) 105, storage subsystem 110, input devices 120, display 125, network interface 135, and bus 140.

Processing unit(s) 105 can include a single processor, which can have one or more cores, or multiple processors. In some embodiments, processing unit(s) 105 can include a general-purpose primary processor as well as one or more special-purpose co-processors such as graphics processors, digital signal processors, or the like. In some embodiments, some or all processing units 105 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 105 can execute instructions stored in storage subsystem 110.

Storage subsystem 110 can include various memory units such as a system memory, a read-only memory (ROM), and a permanent storage device. The ROM can store static data and instructions that are needed by processing unit(s) 105 and other modules of electronic device 100. The permanent storage device can be a read-and-write memory device. This permanent storage device can be a non-volatile memory unit that stores instructions and data even when computer system 100 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that the processor needs at runtime.

Storage subsystem 110 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 110 can include removable storage media that can be readable and/or writeable; examples of such media include compact disc (CD), read-only digital versatile disc (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 110 can store one or more software programs to be executed by processing unit(s) 105, such as a browser application 145. "Software" refers generally to sequences of instructions that, when executed by processing unit(s) 105 cause computer system 100 to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 110, processing unit(s) 105 can retrieves program instructions to execute and data to process in order to execute various operations described herein.

A user interface can be provided by one or more user input devices 120, display device 125, and/or and one or more other user output devices (not shown). Input devices 120 can include any device via which a user can provide signals to computing system 100; computing system 100 can interpret the signals as indicative of particular user requests or information. In various embodiments, input devices 120 can include any or all of a keyboard touch pad, touch screen, mouse or other pointing device, scroll wheel, click wheel, dial, button, switch, keypad, microphone, and so on.

Display 125 can display images generated by electronic device 100 and can include various image generation technologies, e.g., a cathode ray tube (CRT), liquid crystal display (LCD), light-emitting diode (LED) including organic light-emitting diodes (OLED), projection system, or the like, together with supporting electronics (e.g., digital-to-analog or analog-to-digital converters, signal processors, or the like). Some embodiments can include a device such as a touchscreen that function as both input and output device. In some embodiments, other user output devices can be provided in addition to or instead of display 125. Examples include indicator lights, speakers, tactile "display" devices, printers, and so on.

In some embodiments, the user interface can provide a graphical user interface, in which visible image elements in certain areas of display 125 are defined as active elements or control elements that the user selects using user input devices 120. For example, the user can manipulate a user input device to position an on-screen cursor or pointer over the control element, then click a button to indicate the selection. Alternatively, the user can touch the control element (e.g., with a finger or stylus) on a touchscreen device. In some embodiments, the user can speak one or more words associated with the control element (the word can be, e.g., a label on the element or a function associated with the element). In some embodiments, user gestures on a touch-sensitive device can be recognized and interpreted as input commands; these gestures can be but need not be associated with any particular array in display 125. Other user interfaces can also be implemented.

Network interface 135 can provide voice and/or data communication capability for electronic device 100. In some embodiments, network interface 135 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 135 can provide wired network connectivity (e.g., Ethernet) in addition to or instead of a wireless interface. Network interface 135 can be implemented using a combination of hardware (e.g., antennas, modulators/demodulators, encoders/decoders, and other analog and/or digital signal processing circuits) and software components.

Bus 140 can include various system, peripheral, and chipset buses that communicatively connect the numerous internal devices of electronic device 100. For example, bus 140 can communicatively couple processing unit(s) 105 with storage subsystem 110. Bus 140 also connects to input devices 120 and display 125. Bus 140 also couples electronic device 100 to a network through network interface 135. In this manner, electronic device 100 can be a part of a network of multiple computer systems (e.g., a local area network (LAN), a wide area network (WAN), an Intranet, or a network of networks, such as the Internet. Any or all components of electronic device 100 can be used in conjunction with the invention.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 105 can provide various functionality for electronic device 100. For example, processing unit(s) 105 can execute browser application 145. Browser application 145 can provide various functionality such as the ability to retrieve and display content items from local or remote sources (e.g., using HTTP or other data transfer protocols to retrieve and display web pages) and the ability to receive and interpret user input pertaining to the content items, such as selection of an item to view, submission of data by the user in response to a particular content item (e.g., filling out a form on an interactive web page), and so on. In some embodiments, browser application 145 supports "tabbed" browsing, which refers generally to the ability to associate different content items and/or browsing histories with different "tabs" that are considered to be open. An icon representing each open tab (often but not necessarily in the shape of a tab such as one might find on a manila file folder) can be presented by browser application 145 and selected by the user.

It will be appreciated that computer system 100 is illustrative and that variations and modifications are possible. Computer system 100 can have other capabilities not specifically described here (e.g., mobile phone, global positioning system (GPS), power management, one or more cameras, various connection ports for connecting external devices or accessories, etc.). Further, while computer system 100 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 2:
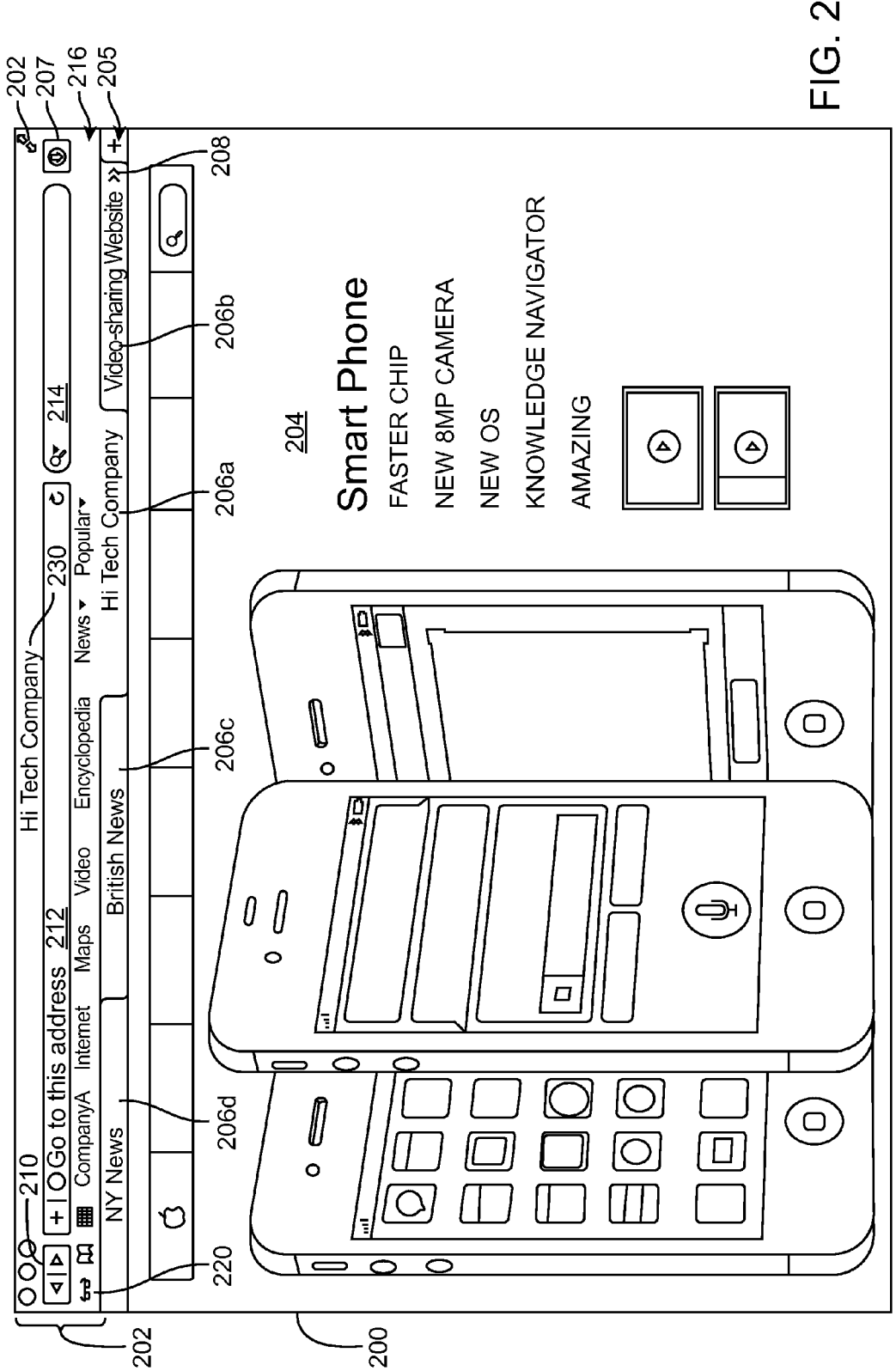
FIG. 2 illustrates a browser screen in a full-frame mode according to an embodiment of the present invention.

FIG. 2 illustrates a browser screen 200 for a browser in full-frame mode according to an embodiment of the present invention. Browser screen 200 and other browser screens described herein can be generated, e.g., in computer system 100 executing browser application 145 of FIG. 1. In some embodiments, browser screen 200 can be rendered within a window as part of a larger rendered work space, e.g., on a laptop or desktop computer, presented as an image on display device 125. In some embodiments, browser screen 200 can be rendered in a full-screen mode in which the entire image area of display device 125 is filled with browser screen 200. Some embodiments may provide a user-operable control element, e.g., element 202, to switch between full-screen and window renderings. (As will become clear below, whether browser screen 200 is rendered full-screen or in a window is independent of whether the browser is in full-frame mode.)

Browser screen 200 includes a user interface area 204, also sometimes referred to as the "chrome," and a page display area 204. In full-frame mode, page display area 204 is filled by the active content item. In this example and other examples herein, the content item can be a web page; however, those skilled in the art will appreciate that a browser can be used to navigate among and view other types of content items, and the invention is not limited to web pages.

Chrome 202 can include a tab display area 205 that displays tab indicators (or simply tabs) 206a-206d corresponding to the currently open tabs. In this example, tab 206a is the active tab, meaning the tab associated with the displayed page, in this case page 204. Active tab 206a is rendered in as being visually in front of (or on top of) adjacent tabs 206b, 206c. Various effects such as shadowing and highlighting can be used to visually distinguish active tab 206a from other open tabs 206b-206d. A plus button 207 can be provided to allow the user to open a new tab. Open tabs can be closed, e.g., by clicking on a "close" icon in the tab (not shown in FIG. 2).

In this example, browser application 145 can have any number of tabs open at a given time, although a visible tab indicator might not be rendered for each open tab, e.g., due to limitations on available space in tab display area and a desired minimum size of each tab indicator. Tabs without visible indicators are referred to as "hidden," and a visual indicator such as chevron 208 can be used to signal the existence of hidden tabs. Chevron 208 can be a user-operable control element that the user can select to view a list of the hidden tabs. In some embodiments, hidden tabs can also be open to the left of tab 206d. A chevron (not shown) can be used to indicate the presence of and view a list of any such tabs.

Chrome 202 can also include other user-operable control elements. By way of illustration, those elements can include back and forward buttons 210, which a user can operate to return to a previously-viewed page in the current tab or advance from a previously-viewed page to a subsequently viewed page in the same tab. URL bar 212 can display the URL of active page 204 and can also be operated to enter a URL and instruct browser application 145 to retrieve and display the corresponding page in the currently active tab. Search bar 214 can be used to enter a text query for a search engine, with the search results being presented as a new page in the currently active tab. Other control elements can be provided, such as controls in row 16, which can, for instance, allow the user to access favorite or recently-viewed pages. These control elements can be generally conventional in nature and a detailed description is omitted.

Chrome 202 in some embodiments includes a "perspective" button 220 that the user can operate to toggle between the full-frame mode shown in FIG. 2 and an array mode. The array mode provides the user with a different perspective on the open tabs and an enhanced ability to quickly browse through the current pages of all of the open tabs, e.g., in order to find a particular page.

Figure 3:
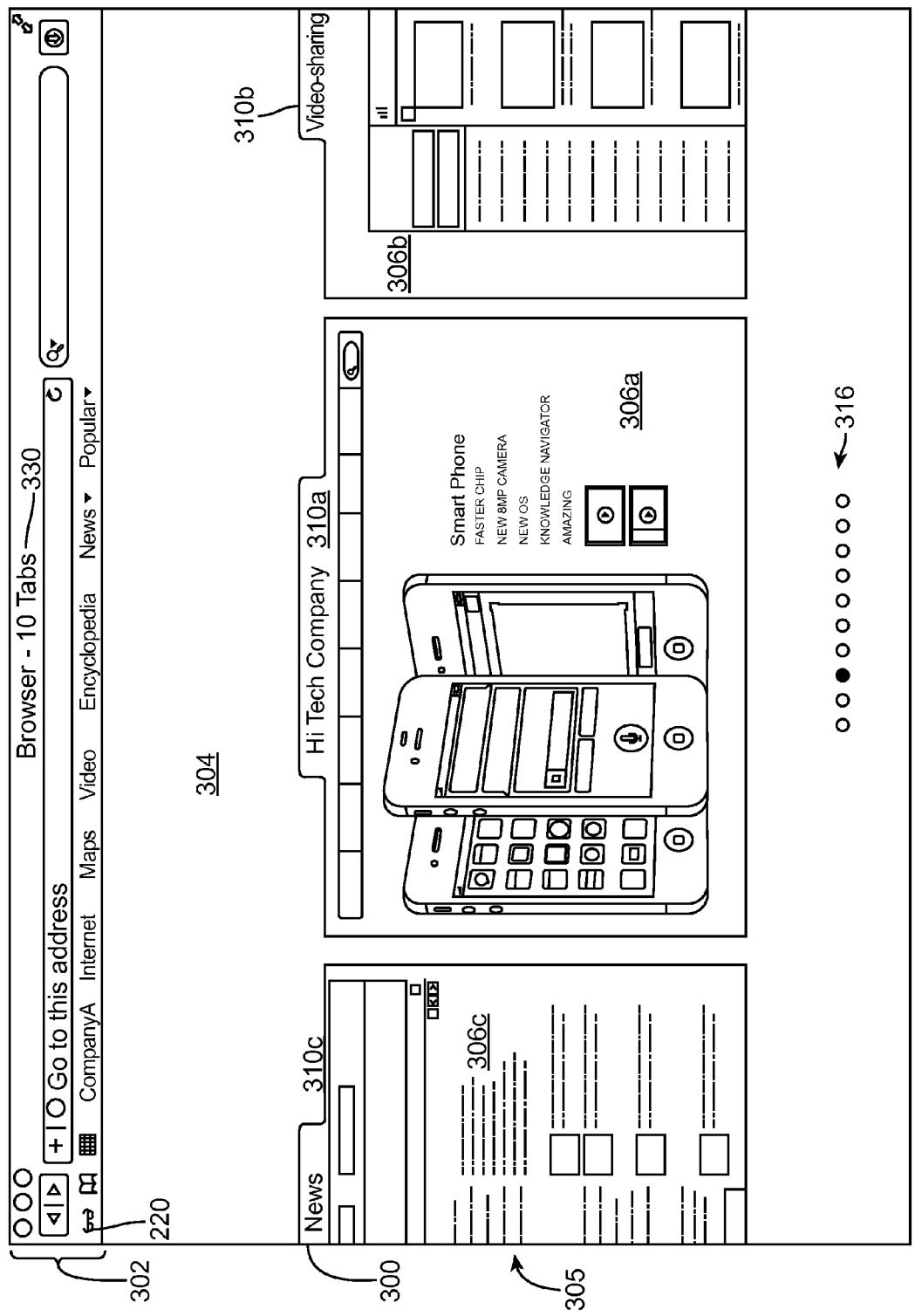
FIG. 3 illustrates a browser screen in an array mode according to an embodiment of the present invention.

FIG. 3 illustrates a browser screen 300 in array mode according to an embodiment of the present invention. Like in the full-frame mode illustrated in FIG. 2, browser screen 300 in array mode has chrome 302 and page-display area 304. In this embodiment, chrome 302 differs from chrome 202 in that tab display area 206 is not drawn. (As shown below, tab display area 206 can be thought of as "hidden" behind chrome 302 in array mode.)

Page-display area 304 in array mode may not display just a single page. Instead, it can display a portion of an array 305 of pages 306, including page 306a (fully visible) and pages 306b and 306c (each partially visible). Array 305 includes one page 306 for every open tab in browser screen 200, although not all of the pages or tabs are visible. In some embodiments, array 305 is a strip that is one page high and N pages wide, where N is the number of open tabs in browser application 145. Each page 306 in array 305 is rendered at a size that is reduced relative to its full-frame-mode rendering, so that more than one page can be visible (or partially visible) at a time. The order of pages 306 in array 305 can correspond to the order of tabs 206 (FIG. 2) as they were presented in full-frame mode immediately prior to entering array mode; as described below, this correspondence can help the user understand the relationship between the two modes.

In this embodiment, each page 306 in array 305 has a tab 310 attached to it at the top. Like tabs 206 in the full-frame view of FIG. 2, each tab 310 can include the title of the corresponding page. Tabs 310 can stand in one-to-one correspondence with tabs 206 of FIG. 2, including any hidden tabs (although fewer tabs are visible in FIG. 3 because the tabs are spaced farther apart). Array 305 is scrollable to the left or right in response to user input so that different pages 306 come into or go out of view as the array is scrolled.

Figure 4:
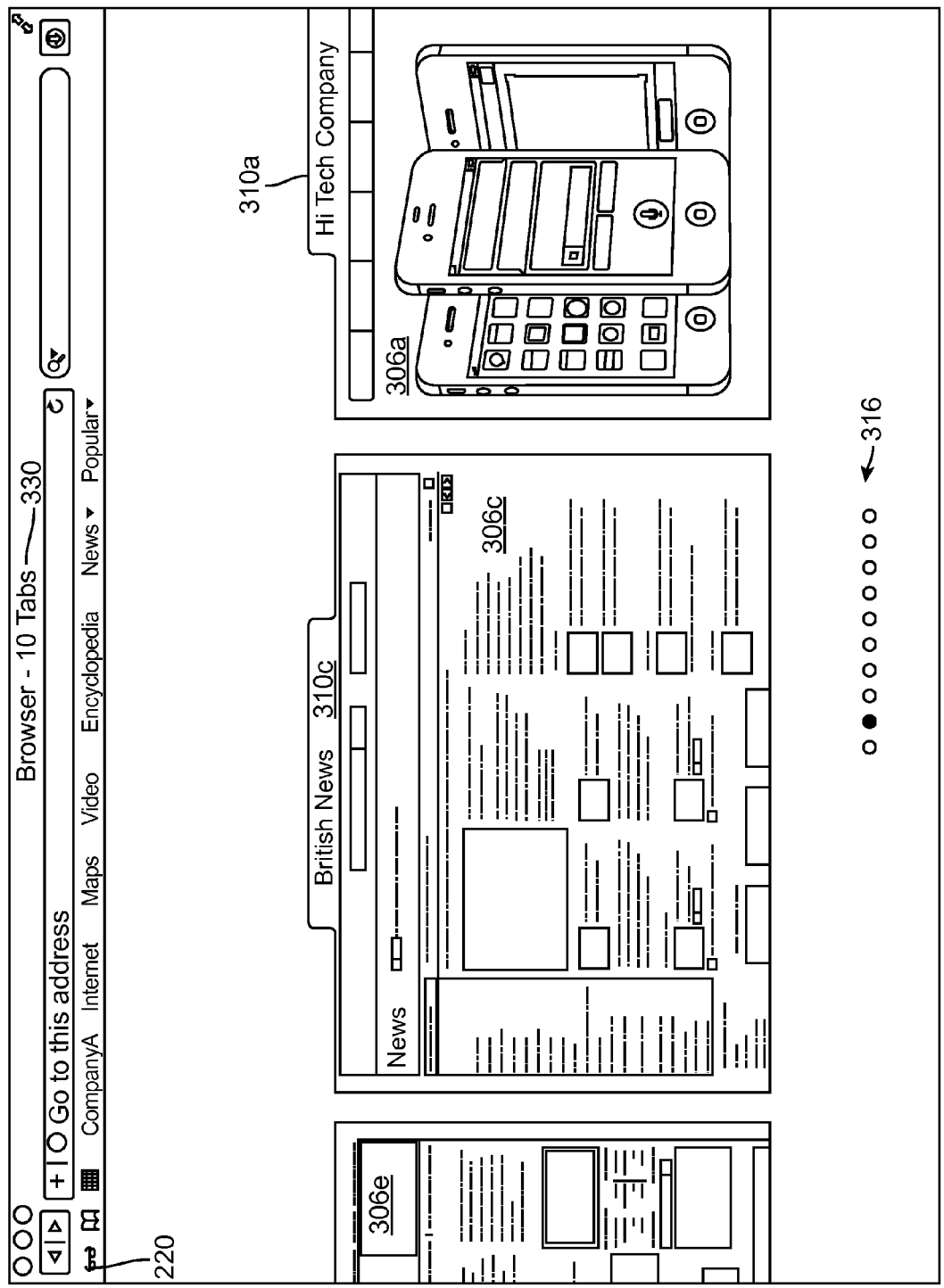
FIG. 4 illustrates another browser screen in an array mode according to an embodiment of the present invention, indicating scrolling.

FIG. 4 illustrates array 305 after scrolling to the left by approximately one page 306. Page 306c is now near the center, with page 306a partly visible at the right and a different page (page 306e) coming into view at the left while page 306d has moved out of view. Thus, as shown, all the open tabs can be regarded as being present in array mode, even though some tabs might not be visible at any given time. Each page 306 and its corresponding tab 310 move together as a unit as array 305 is scrolled. (As new pages become visible, they can be loaded from the cache of browser application 145 or dynamically reloaded from their original sources).

Referring again to FIG. 3, in some embodiments, a position indicator 316 can be provided to visually suggest which portion of array 305 is visible. In some embodiments, position indicator 316 includes a row of dots, with one dot corresponding to each open tab. The page 306 that is currently closest to the center of page display area 304 is identified, and the dot corresponding to the position of page 306 in array 305 is highlighted. Thus, for example, referring to FIG. 2, tab 206a is the third tab 206 from the left end. If tab 206a corresponds to tab 310a in the array mode shown in FIG. 3, then the third dot from the left would be highlighted because page 306a, which is attached to tab 310a, is closest to the center of page display area 304. As array 305 is scrolled left or right, different pages 306 become closest to the center and different dots in position indicator 316 can be highlighted. Thus, for example, in FIG. 4, the second dot from the left is highlighted where page 306c is closest to center.

In other embodiments, position indicator 316 can include a fixed or arbitrary number of dots, and the highlighted dot can indicate the approximate position within the array rather than being an exact locator. For example, if 30 tabs are open and ten dots are used in indicator 316, highlighting the first dot on the left in indicator 316 would indicate that one of the first three pages from the left is nearest center, highlighting the second dot from the left in indicator 316 would indicate that one of the next three pages from the left is nearest center, and so on. Other representations of the approximate or exact portion of array 305 that is currently visible can also be used. For example, a translucent box (not shown) representing page-display area 304 could "slide" to the left or right across the dots of the indicator as the array is scrolled left or right.

In some embodiments, position indicator 316 can be operable as a control element. A user can select (e.g., with a cursor to touch contact) a dot in position indicator 316 to "jump" the array to the selected position (or approximate position); the jump can be rendered, e.g., as a very fast scroll to the selected position or as an abrupt shift.

In the embodiments of FIGS. 3 and 4, content items in array mode can be "live" rather than static representations. For example, if page 306a was the active page and was playing a video when browser application 145 switched to array mode, the video can continue to play while browser application 145 is in array mode. In some embodiments, the user can interact with visible pages in array mode, e.g., to start or stop video playback or to select a hyperlink in a currently visible page (e.g., page 306a in FIG. 3) and thereby change the current page for that tab. In some embodiments, selecting a link causes browser screen 200 to exit array mode and return to full-frame mode. The tab in which the link was selected becomes the active tab, and the linked-to page becomes the current page for the active tab. In other embodiments, selecting a link causes browser screen 200 to change the current page for the tab in which the link was selected without exiting array mode.

At any time while in array mode, the user can choose to return to full-frame mode. In some embodiments, selecting any visible page 306 (e.g., by clicking or tapping on the page or its tab) causes browser application 145 to return to full-frame mode (e.g., as shown in FIG. 2), with the selected tab/page becoming the active tab/page. In some embodiments, the user can toggle between full-frame and array modes using perspective button 220. If perspective button 220 is selected while in array mode, in some embodiments, the page 306/tab 310 that is currently closest to the center of page display area 304 becomes the active page/tab. In other embodiments, selecting perspective button 220 to exit array mode results in the last page/tab that was active prior to entering array mode becoming active again, with the toggle in this case effectively functioning to "cancel" navigation between tabs.

Figure 5:
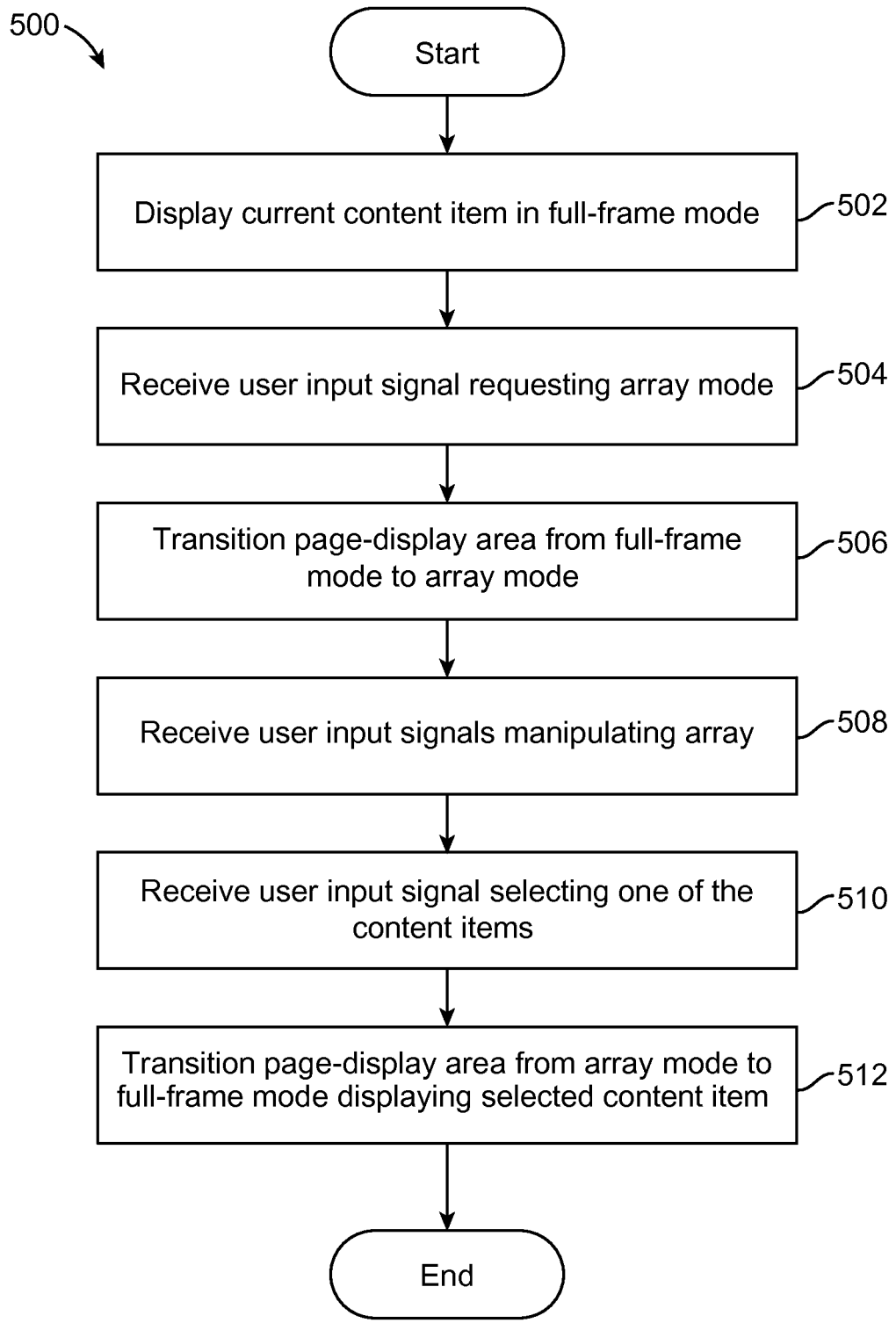
FIG. 5 is a flow diagram of a process that can be used for navigating between tabs in a content browser according to an embodiment of the present invention.

In some embodiments, array mode can be used to quickly locate and navigate to a particular tab, regardless of how many tabs are open. FIG. 5 is a flow diagram of a process 500 that can be used for navigating between tabs in a content browser such as browser application 145 according to an embodiment of the present invention.

At block 502, browser application 145 displays a current content item (e.g., a web page) in the full-frame mode, e.g., as shown in FIG. 2. At block 504, browser application 145 can receive a user input requesting a switch to array mode. For example, the user can toggle perspective button 220 or make a gesture (such as a pinching gesture described below) or operate another control associated with mode switching. At block 506, in response to the user input, browser application 145 can transition the page-display area from full-frame mode to array mode (e.g., as shown in FIG. 3), with the content items being displayed in an array. As described below, in some embodiments, the transition can include a smooth animation that facilitates user understanding of the relationship between the tabs in the full-frame mode and the tabbed content items in the array mode.

At block 508, browser application 145 can receive additional user inputs manipulating the array of content items. For example, the user may scroll the array to a different position, interact with a content item in the array, or the like.

At block 510, browser application 145 can receive a user input selecting one of the content items for viewing in full-frame mode. In response, at block 512, browser application 145 can transition the page-display area from array mode back to the full frame mode, with the selected content item becoming the current content item. As with the transition to array mode at block 506, in some embodiments, the transition at block 512 can include a smooth animation that facilitates user understanding of the relationship between the tabbed content items in the array mode and the tabs in the full-frame mode.

It will be appreciated that the navigation process and display modes described herein are illustrative and that variations and modifications are possible. Steps described as sequential may be executed in parallel, order of steps may be varied, and steps may be modified, combined, added or omitted.

For instance, interaction with content items is not limited to scrolling and selecting items. As noted above, in some embodiments, a user can play media content or follow hyperlinks in a content item while remaining in array mode. In addition, in some embodiments, the user can manipulate the tabs while in array mode. For example, the user can rearrange the order of pages in the array, e.g., by clicking and dragging (e.g., with a cursor or touch input) a page to a new position in the array.

In some embodiments, the user can close a tab while in array mode. For example, each tab 310 in FIG. 3 can have a "close" button (e.g., an X) in one corner, and selecting the close button for a tab closes that tab. In some embodiments, the close button can become visible only when the user hovers an on-screen pointer over the tab; in other embodiments, the close button can always be visible. In still other embodiments, the close button can be next to the tab or below the page or elsewhere as desired, provided that it is clear which tab will be closed if the button is selected. When a tab is closed, other pages in the array can be shifted to fill in the gap.

In some embodiments, the user can open a tab while in array mode. For instance, an "open tab" control element (e.g., a plus button) can be rendered in an unused portion of page-display area 304 of FIG. 3 (e.g., next to or below position indicator 316). The new tab can be shown by inserting a page into the array, e.g., between pages 306c and 306a in FIG. 3; existing pages can be shifted to create space for the new page. The new page can initially be blank, or a default page can be used.

Some embodiments can also provide features to enhance the scrolling experience. For example, if audio is playing in the current page in full-frame mode at the time the user enters array mode, the audio can continue to play as the browser transitions to array mode; in some embodiments, the volume can decrease to suggest a page moving farther away (as the rendered page gets smaller). When the array is scrolled, the audio output can shift left or right with the page and can fade out or in volume as the page gets farther from or closer to the visible portion of the array.

In the examples shown in FIGS. 2-4, full-frame mode and array mode are visually distinguished by the appearance of the content items (full-frame versus reduced size), by the presence or absence of a tab area visible below the chrome, and by the title in the browser window. As shown in FIG. 2, in full-frame mode, the window title in title bar 230 can match or include the title or other identifier for the currently active tab. As shown in FIG. 3, in array mode, the window title in title bar 330 can change to a generic title, e.g., indicating the number N of open tabs. It is to be understood that any combination of visual indicia can be used to distinguish array mode and full-frame mode; examples include color schemes (e.g., the chrome or a portion thereof can change color), fonts, presence or absence of various control elements or labels in the chrome, or the like. In some embodiments, the size and arrangement of the content items in array mode can be adjusted based on considerations such as the readability of pages at reduced size. In some embodiments, the pages in array mode can be rendered with shadows or other visual effects so that they appear to float above the background of page-display area 304. To add to the illusion of floating, the background can be rendered as a static pattern, with the pages moving relative to the static pattern when the array is scrolled.

Further, while the array mode illustrated herein arranges the content items in a 1×N strip, which aligns naturally with the arrangement of tabs in the tab area in full-frame mode, other embodiments can use different array dimensions, e.g., to allow more pages to be at least partially visible at any given time. (An embodiment using a grid is described below.) In some embodiments, the array dimensions can be controlled by a user-selectable setting parameter.

Some embodiments can provide smooth animated transitions between full-frame and array mode. These transitions can be designed to help the user understand the relationship between the two modes. FIGS. 6-9 provide a sequence of screen images illustrating a transition from full-frame to array mode that can be implemented according to an embodiment of the present invention, and FIGS. 9-14 provide a sequence of screen images illustrating a corresponding transition from array mode to full-frame mode that can be implemented according to an embodiment of the present invention.

For transitions into array mode, the beginning point for the transition can be a browser screen in full-frame mode as shown in FIG. 2, and the end point can be a browser screen in array mode as shown in FIG. 3.

Figure 6:
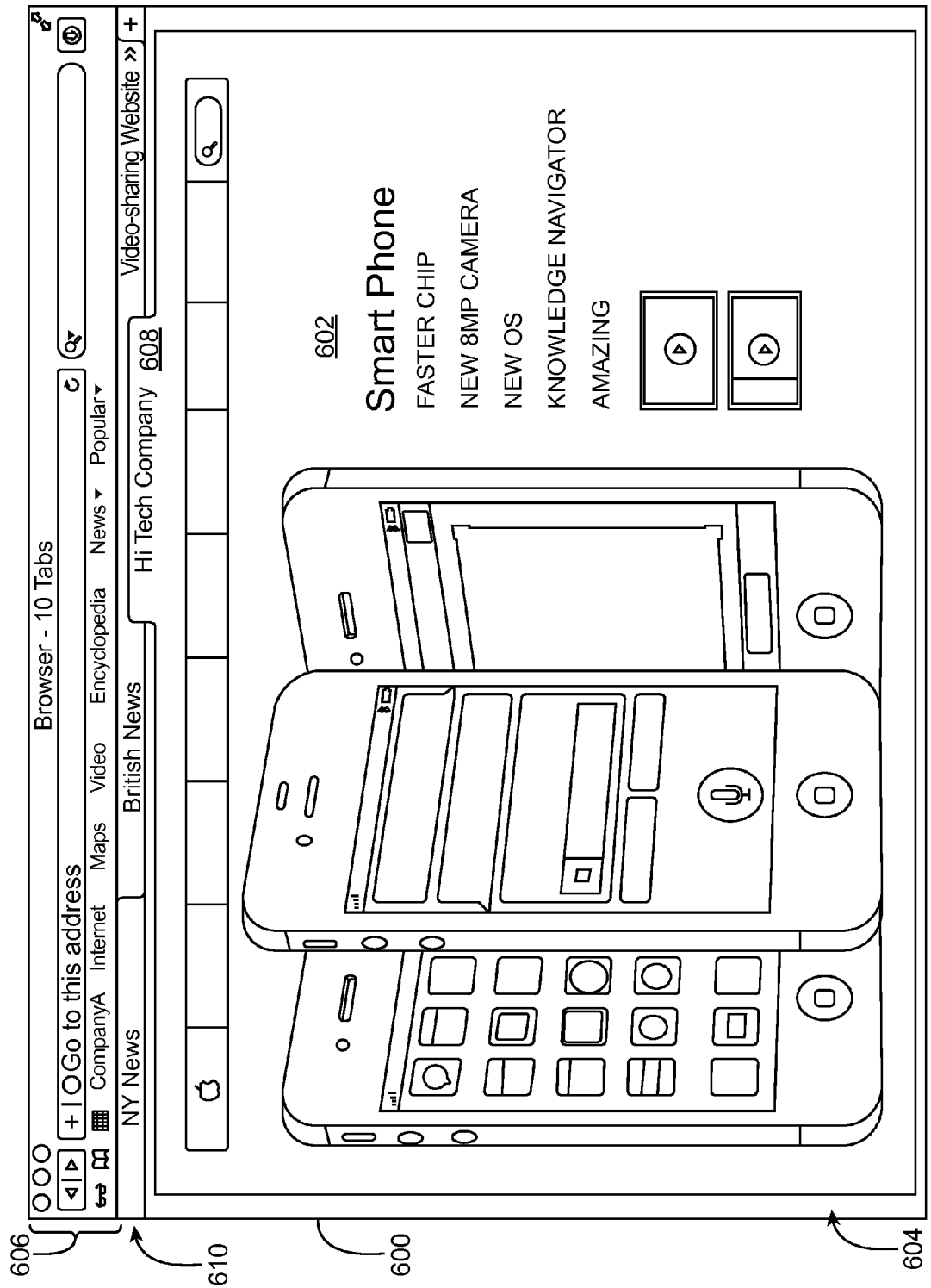
FIGS. 6-8 illustrate a browser screen in various stages of a transition from full-frame to array mode that can be implemented according to an embodiment of the present invention.

FIG. 6 illustrates a browser screen 600 during an early stage in the transition. Page 602, which was previously displayed in full-frame mode begins to shrink so that a background region 604 becomes visible near the edges of the page-display area of browser screen 600. At the same time, tab 608 detaches from chrome 606, inverts (so that the wider end is at the bottom instead of the top as in FIG. 2) and attaches to the top of page 602. The initial attachment can be at the same point where tab 608 appeared relative to page 602 when in full-frame view. Thus, the user can see tab 608 being separated from the rest of tab row 610 and attached to its page.

Figure 7:
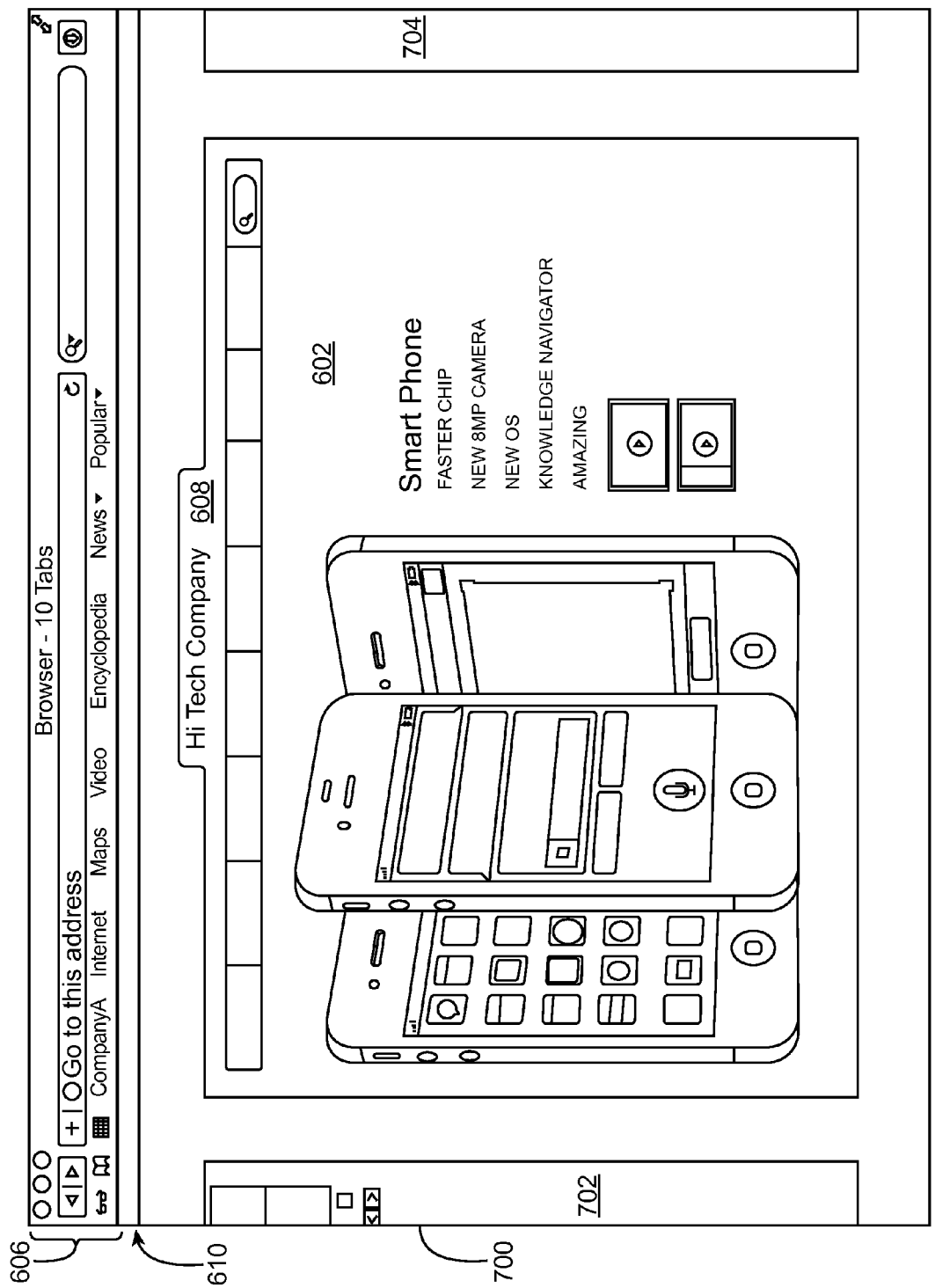

FIG. 7 illustrates a browser screen 700 during a subsequent stage in the transition. Page 602 shrinks further, and edges of adjacent pages 702, 704 become visible. Tab 608 slides horizontally toward the center-top of page 602. At the same time, the rest of tab row 610 begins to disappear from view. In this example, the animation is such that tab array 610 appears to slide upward behind chrome 606.

Figure 8:
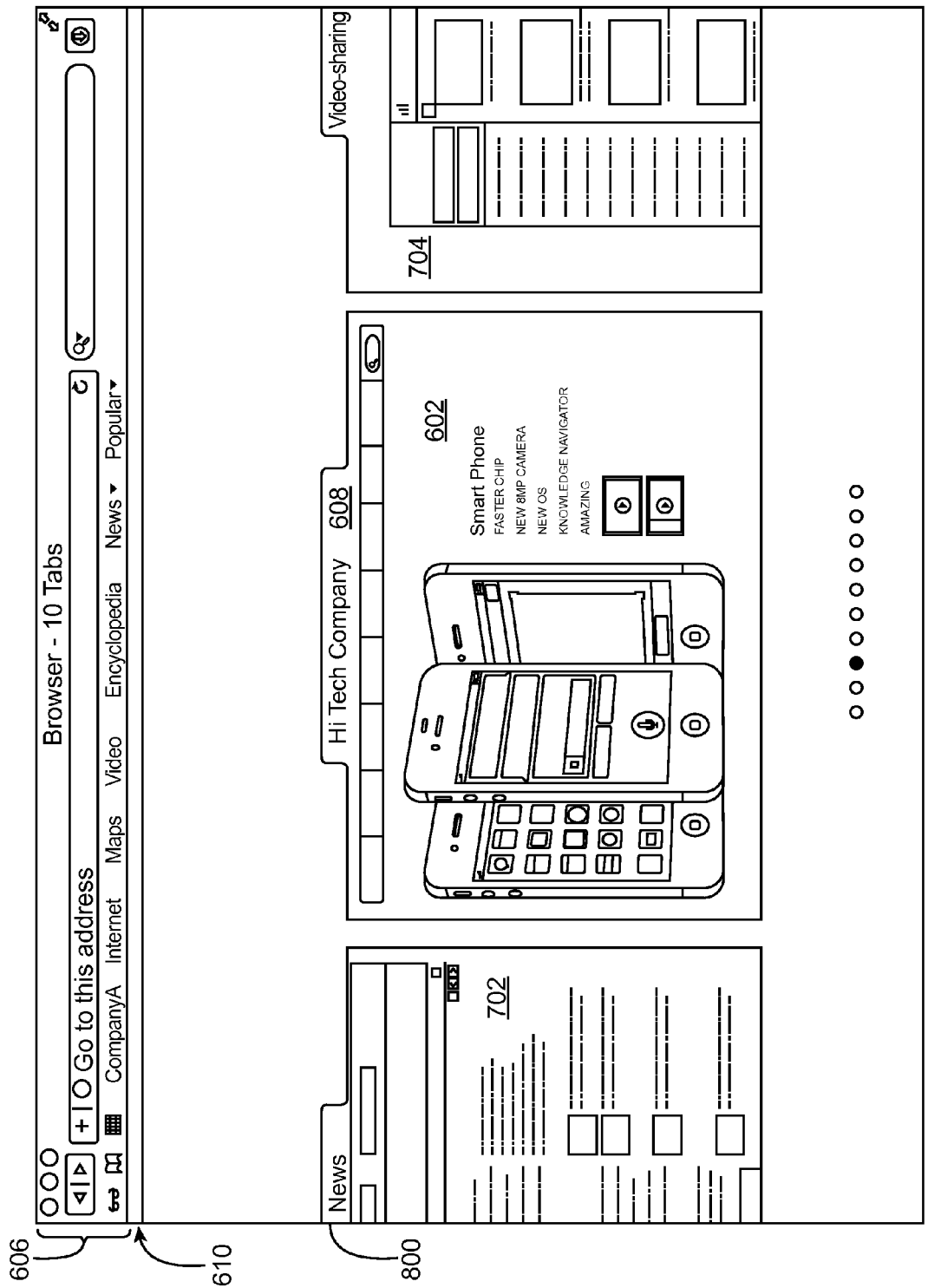

FIG. 8 illustrates a browser screen 800 as the transition continues, with page 602 continuing to shrink. Pages 702 and 704 also shrink correspondingly, and larger portions of pages 702, 704 become visible. Tab 608 continues to slide toward a top-center alignment, and tab array 610 slides further behind chrome 708. The transition can culminate in the array-mode browser screen 300 as shown in FIG. 3. The accumulation of these transition effects indicates to the user that she is now in a new browsing model.

Figure 9:
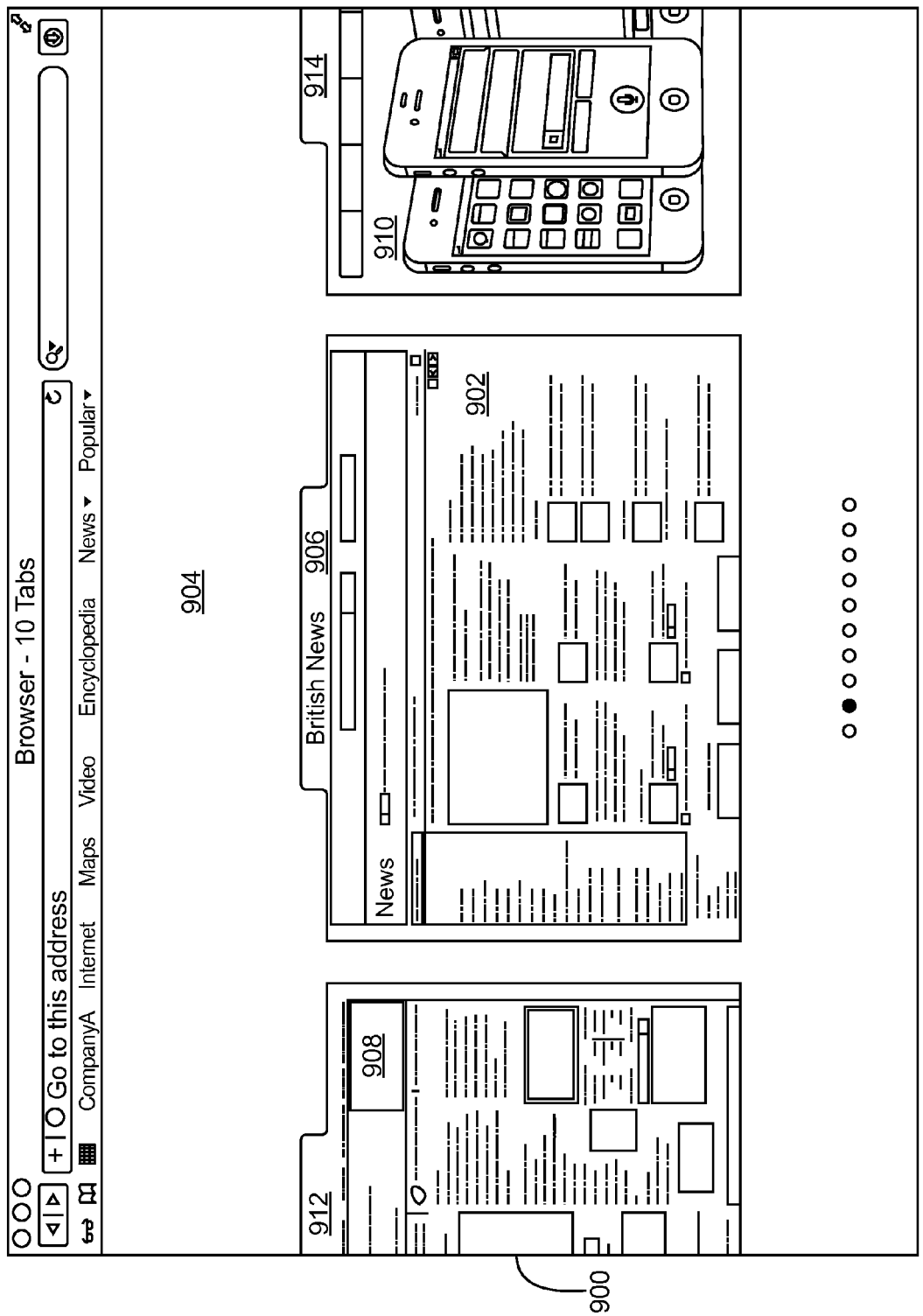
FIGS. 9-14 illustrate a browser screen in various stages of a transition from array mode to full-frame mode that can be implemented according to an embodiment of the present invention.

A transition in the reverse direction, from array mode to full-screen mode will now be described. FIG. 9 illustrates a browser screen 900 in array mode just prior to a transition to full-frame mode. Page 902, which will become the active page, is shown near the center of page display area 904. Tab 906 is displayed at the top-center of page 902. Adjacent pages 908 and 910, with their corresponding tabs 912, 914, are partially visible.

Figure 10:
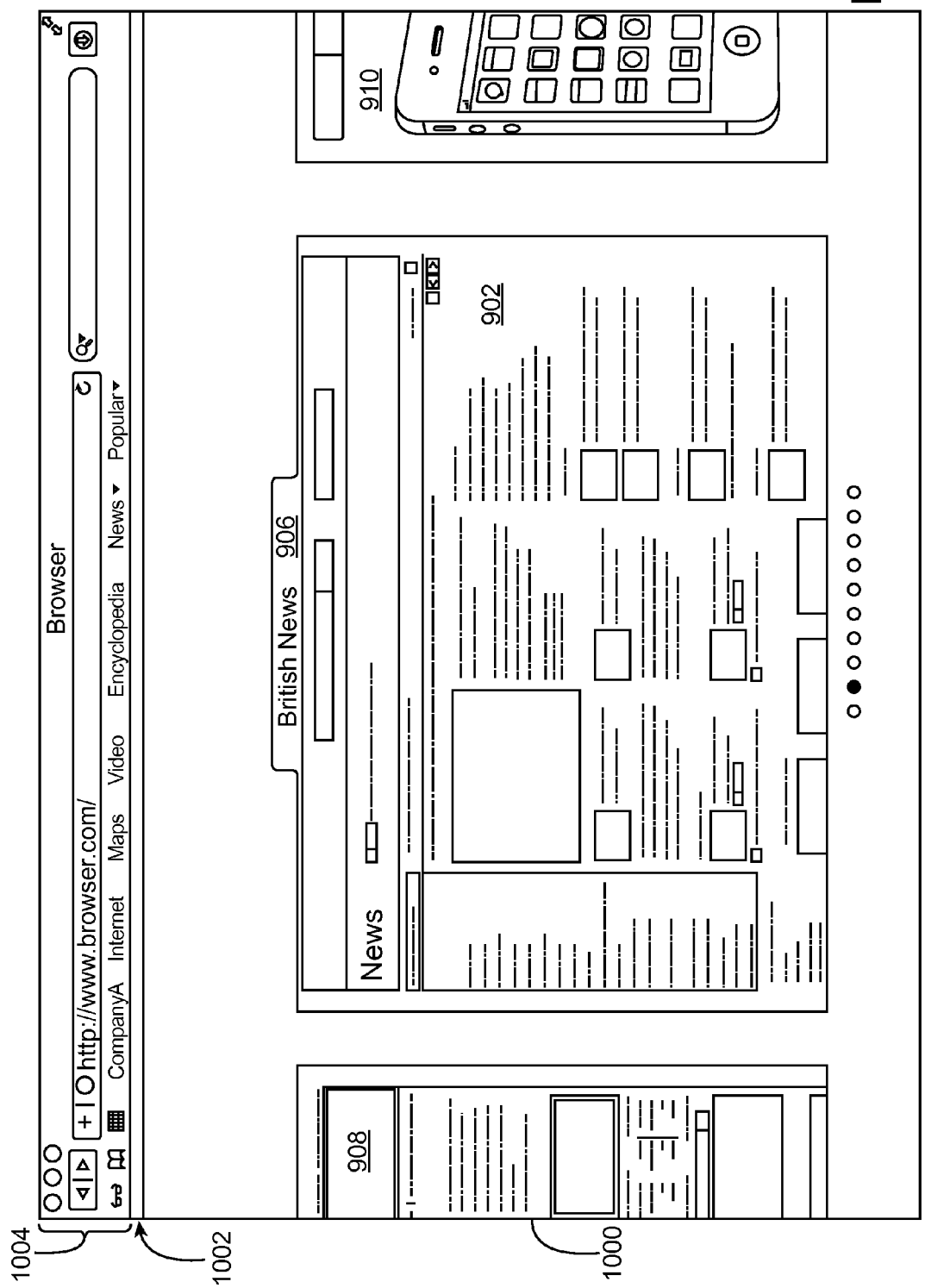

FIG. 10 illustrates a browser screen 1000 during an early stage in the transition. Page 902 expands, and tab 906 slides away from center toward its eventual destination position (i.e., the point where it will appear to be inserted into the tab row as described below). Pages 908 and 910 also expand, but a smaller portion of each page is now visible due to expansion of page 902. Tab row 1002 begins to emerge. In this example, the animation is such that tab row 1002 appears to slide downward from behind chrome 1004, reversing the effect seen in FIGS. 6-8.

Figure 11:
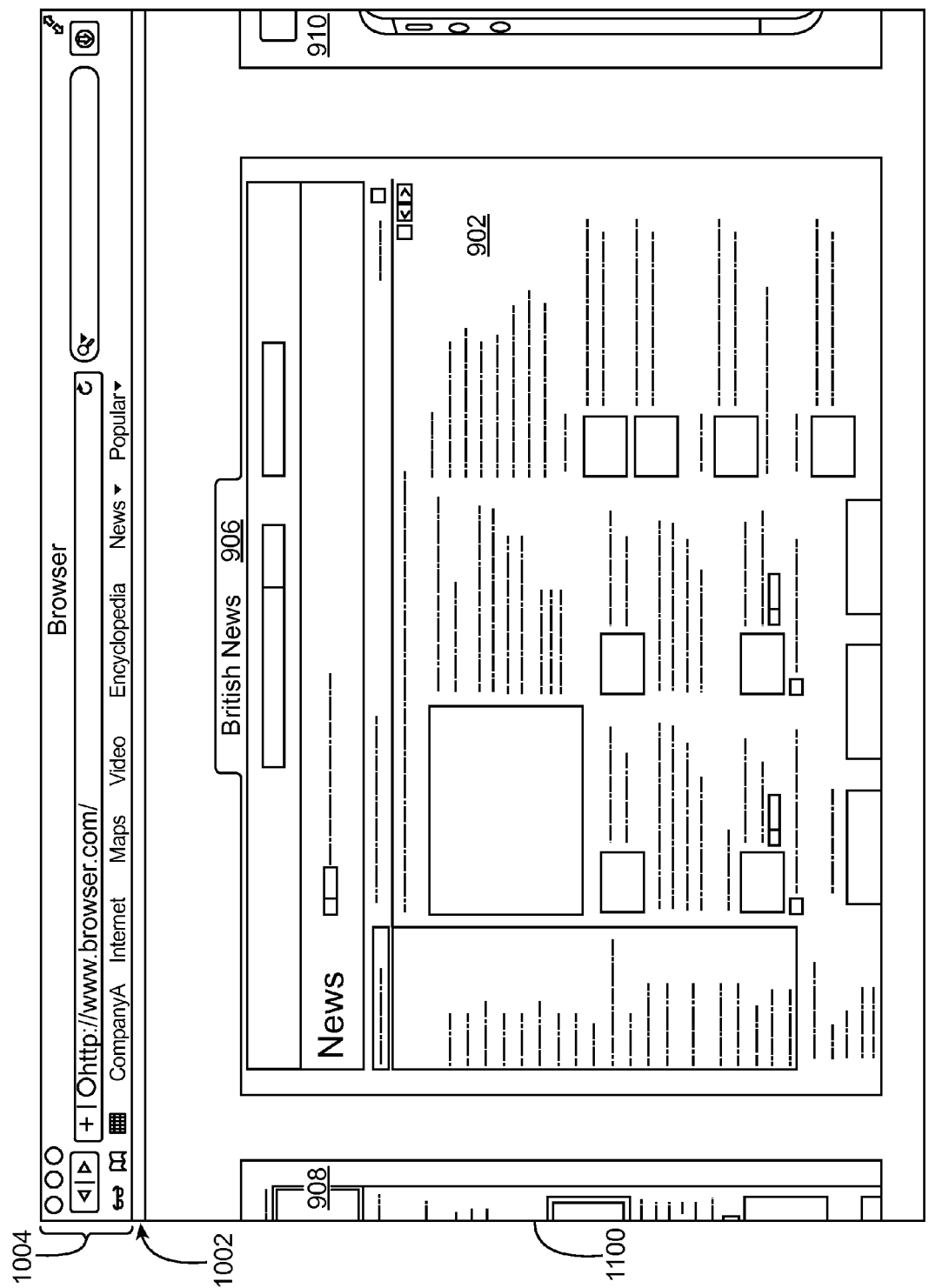

FIG. 11 illustrates a browser screen 1100 during a subsequent stage in he transition. Page 902 continues to expand, and tab 906 continues to slide toward its eventual destination position. Pages 908 and 910 also expand, but smaller portions of these pages are visible due to continuing expansion of page 902. Tab array 1002 continues to slide downward.

Figure 12:
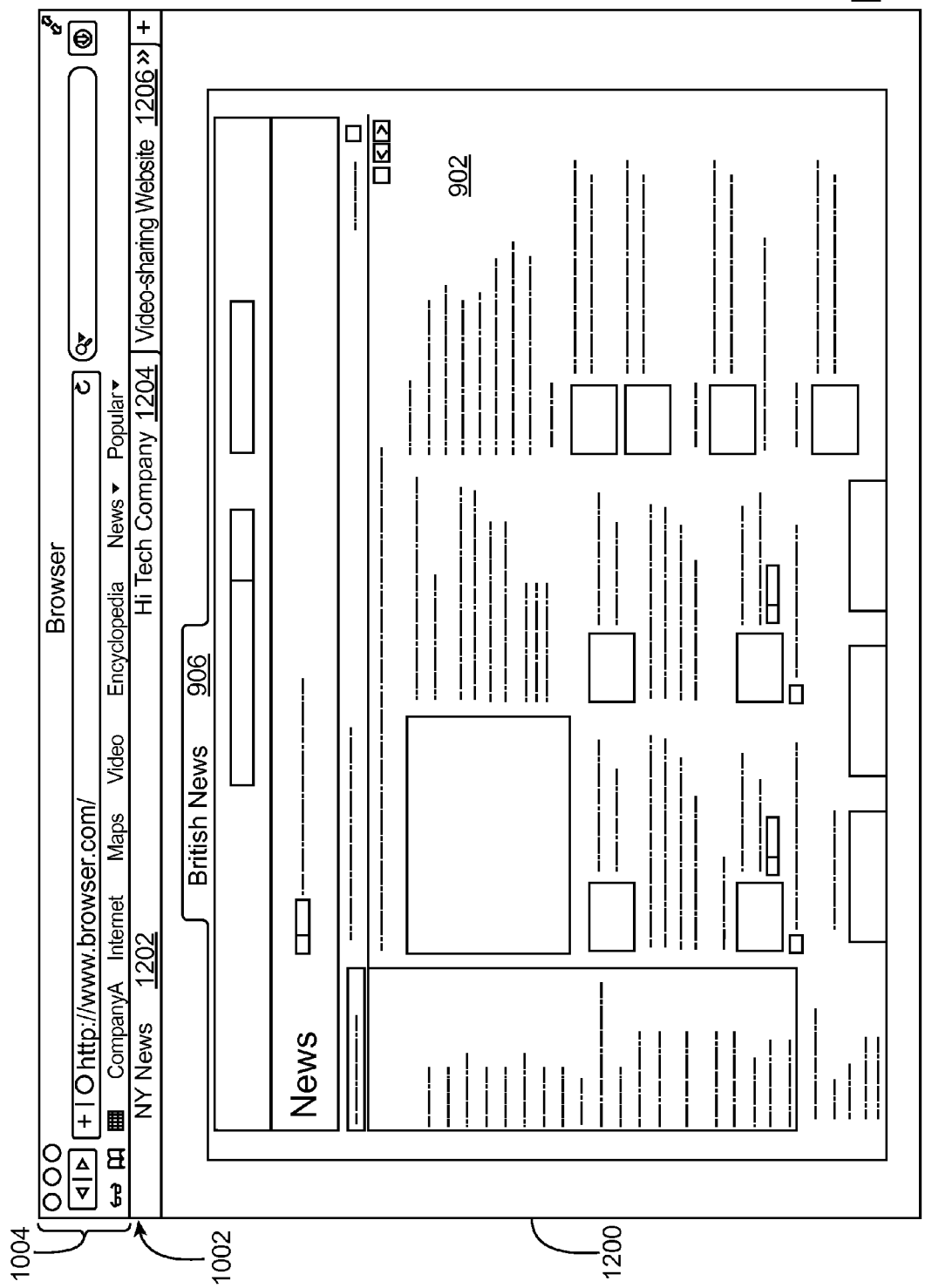

FIG. 12 illustrates a browser screen 1200 as the transition continues. Page 902 has expanded enough that other pages are not visible, and tab 906 has almost reached its destination position. Tab row 1002 continues to slide downward and inactive tabs 1202, 1204, 1206 fade into place.

Figure 13:
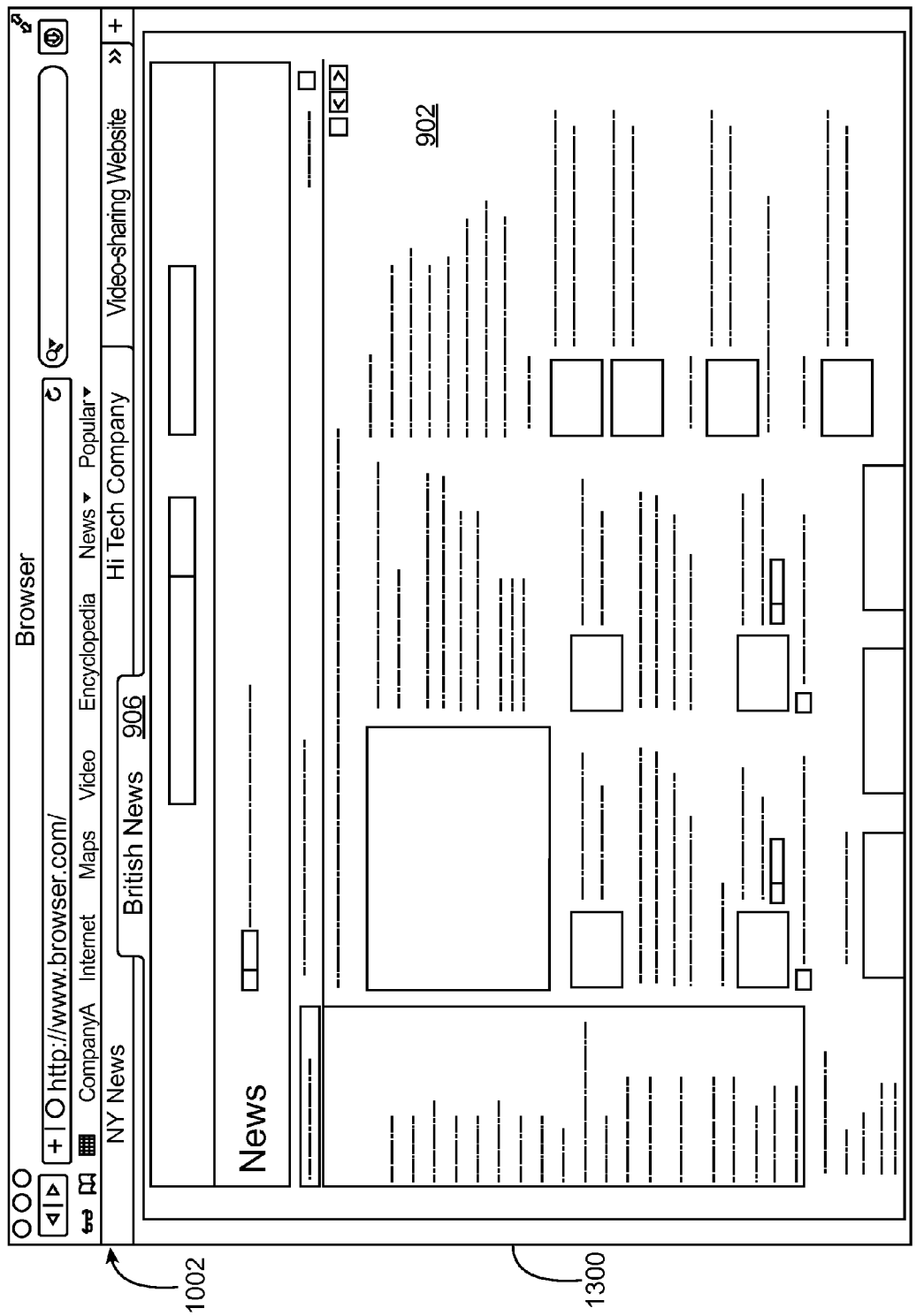

FIG. 13 illustrates a browser screen 1300 at a stage near the end of the transition. Page 902 has almost reached full size, and tab 906 overlays the rest of tab row 1002, at approximately the position it will occupy at the end of the transition.

Figure 14:
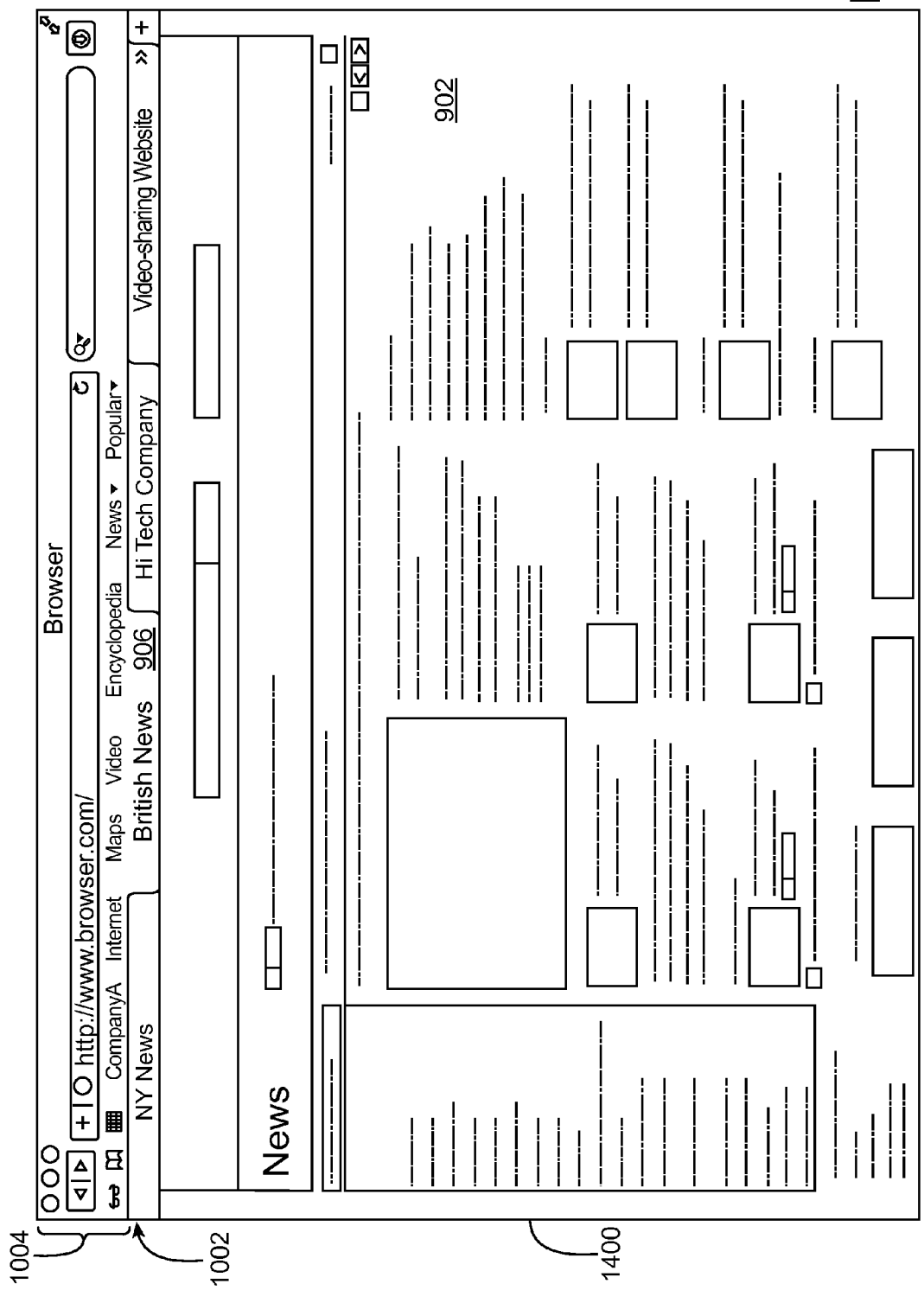

FIG. 14 illustrates a browser screen 1400 at the end of the transition. Page 902 is displayed in full-frame mode, and tab 906 detaches from page 902, inverts (so that the wider end is at the top, not the bottom as in FIG. 13), and attaches to chrome 1004 on top of tab array 1002. Thus, tab 906 has reached its destination position.

In this embodiment, transitions between full-frame and array modes preserve the order of the tabs in the tab row. That is, when transitioning to array mode, the tabbed pages of the array are arranged in the order of the tabs in full-frame mode at the time of the transition. Likewise, when transitioning to full-frame mode, the tabs in the full-frame mode are arranged in the order of the tabbed pages of the array at the time of the transition. (This does not preclude rearranging tabs while in array mode as described above; the rearranged order is preserved in the transition back to full frame mode.)

The transition sequences described herein provide visual cues to help the user understand the relationship between the array and full-frame modes. Detachment of the active tab from the rest of the display (e.g., in FIG. 6) provides an initial visual indication to the user that the user interface is transitioning from a first viewing mode (e.g. full-frame mode) to a second viewing mode (e.g., array mode). This visual indication in combination with other visual indications described herein (e.g., horizontal movement of tab, reduction of the size of the web pages, etc.) provides the user with further indications that a transition is occurring and also visually illustrate the location of the active content item within the array. In some embodiments, a user can understand the transition just from seeing it, without the need for written instructions or tutorials or the like. This allows users to discover and explore the array mode without outside guidance such as user manuals or tutorial videos.

It will be appreciated that the transition sequence described above is illustrative and that variations and modifications are possible. The transition can take place at any rate desired. In some embodiments, the rate of the transition can be tuned based on user preferences. While a smooth transition can help a user understand the relationship between the array and full-frame modes, it is to be understood that a smooth transition is not required. A visual cue, such as a bright flash, can be used with an abrupt jump from one mode to the other, or the browser can simply be re-rendered in the new mode, e.g., within a single frame-refresh cycle of the display.

As described above, switching between array mode and full-frame mode can be done in response to user input. The input can be provided using control elements of the browser, such as perspective button 220 of FIG. 2, and/or by selecting a content item or tab in array mode to view the selected item in full-frame mode. In some embodiments, other user input can be used to trigger a mode switch.

In some embodiments, a computer system such as computer system 100 of FIG. 1 supports a gesture-based user interface. For example, the display on which the various browser screens are presented can have a touch-sensitive surface, and a user's gestures (typically finger and/or hand motions) on the surface can be detected and interpreted as control signals for browser application 145. As another example, a touch-sensitive surface (which can be but need not be capable of displaying information) can be provided as a user input device, and the user's gestures can again be detected and interpreted as control signals for browser application 145.

Where gesture input is available, certain specific gestures can be detected and interpreted by browser application 145 as signaling that browser application 145 should transition between full-frame mode and array mode. Other gestures can be interpreted as controlling the operation of browser application 145 within a particular mode, and some gestures may be interpreted differently depending on whether browser application 145 is in full-frame or array mode. Examples of gesture-based control for browser application 145 will now be described.

Figure 15:
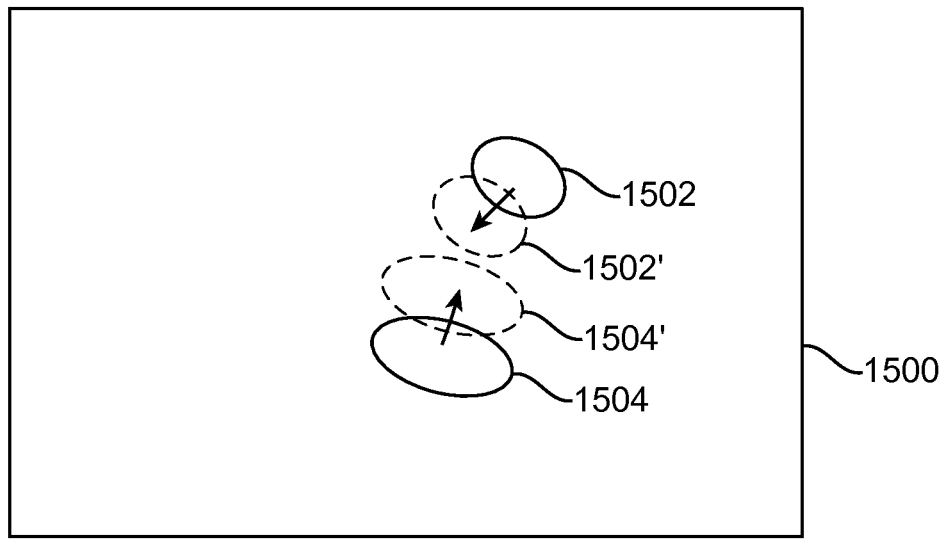
FIG. 15 illustrates contact areas on a touch-sensitive surface for an inward pinch.
Figure 16:
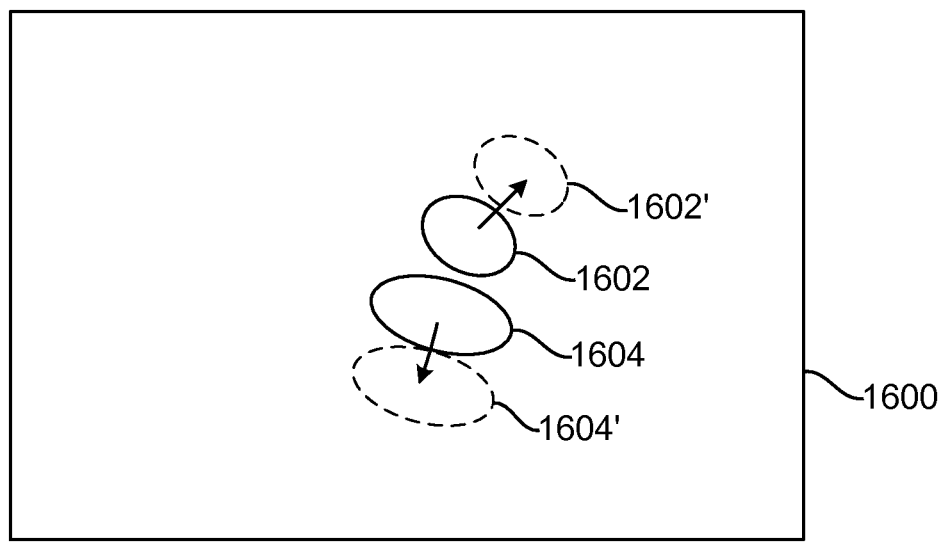
FIG. 16 illustrates contact areas on a touch-sensitive surface for an outward pinch.

In gesture-based interfaces, it is possible to use a "pinching" gesture to control zooming in and out on an area. Pinching gestures are illustrated in FIGS. 15 and 16. FIG. 15 illustrates contact areas on a touch-sensitive surface for an inward pinch. Two contact areas 1502 and 1504 are initially detected on a touch-sensitive surface 1500. For example, the user can place two fingers against surface 1500. Contact areas 1502 and 1504 are then detected as moving generally toward each other, e.g., to areas 1502' and 1504' as indicated by arrows. The inward pinch gesture, which can resemble squeezing an object between the finger tips, can be associated with reducing the size of an item being viewed (zoom out).

FIG. 16 illustrates contact areas on a touch-sensitive surface for an outward pinch. Two contact areas 1602 and 1604 are initially detected on a touch-sensitive surface 1600. For example, the user can place two fingers against surface 1600. Contact areas 1602 and 1604 are then detected as moving generally away from each other, e.g., to areas 1602' and 1604' as indicated by arrows. The outward pinch gesture, which can be the reverse of an inward pinch, can be associated with increasing the size of an item being viewed (zoom in).

In both the inward and outward pinch gestures, either or both contact areas can move; the gesture can be recognized based on the presence of two contact areas and the increase or decrease of distance between them. In some instances, a velocity constraint can be used to distinguish an intentional pinch from an inadvertent pinch (e.g., where the user inadvertently varies the spacing between fingers while making a different gesture such as a two-finger swiping gesture).

In some embodiments of the present invention, the pinch-to-zoom interface paradigm can be leveraged to provide an intuitive way to switch browser application 145 between array mode and full-frame mode. For example, since an inward pinch is associated with reducing the size of an item, an inward pinch while in full-frame mode can be interpreted as a user request to switch to array mode (where content items are rendered at reduced size) and can trigger a transition to array mode. Similarly, since an outward pinch is associated with increasing the size of an item, an outward pinch while in array mode can be interpreted as a user request to switch to full-frame mode (where the currently active content item is rendered at full size). In some embodiments, in response to an outward pinch, the content item that happens to be closest to the center of the page-display area in array mode becomes the active item upon entering full-frame mode. In other embodiments, the user can associate the outward pinch with a specific content item in the array (e.g., by making the outward-pinch gesture within the portion of a touch-screen display that is occupied by that item in a touch-screen display), and the item associated with the outward pinch can become the active item.

In addition, gestures can be used to control operations while in array-mode. For example, the array can be scrolled by a dragging gesture (e.g., with one finger or two fingers sliding across the touch-sensitive surface): a dragging gesture to the left (right) can move the visible portion of the array to the left (right). The distance moved can depend on the length and/or speed of the drag.

In some embodiments, the interpretation of pinch gestures as controlling switching between full-frame and array modes can be integrated with the interpretation of pinch gestures as controlling zoom (magnification or reduction) while in full-frame mode. Examples of processes that can be used for gesture interpretation will now be described.

Figure 17:
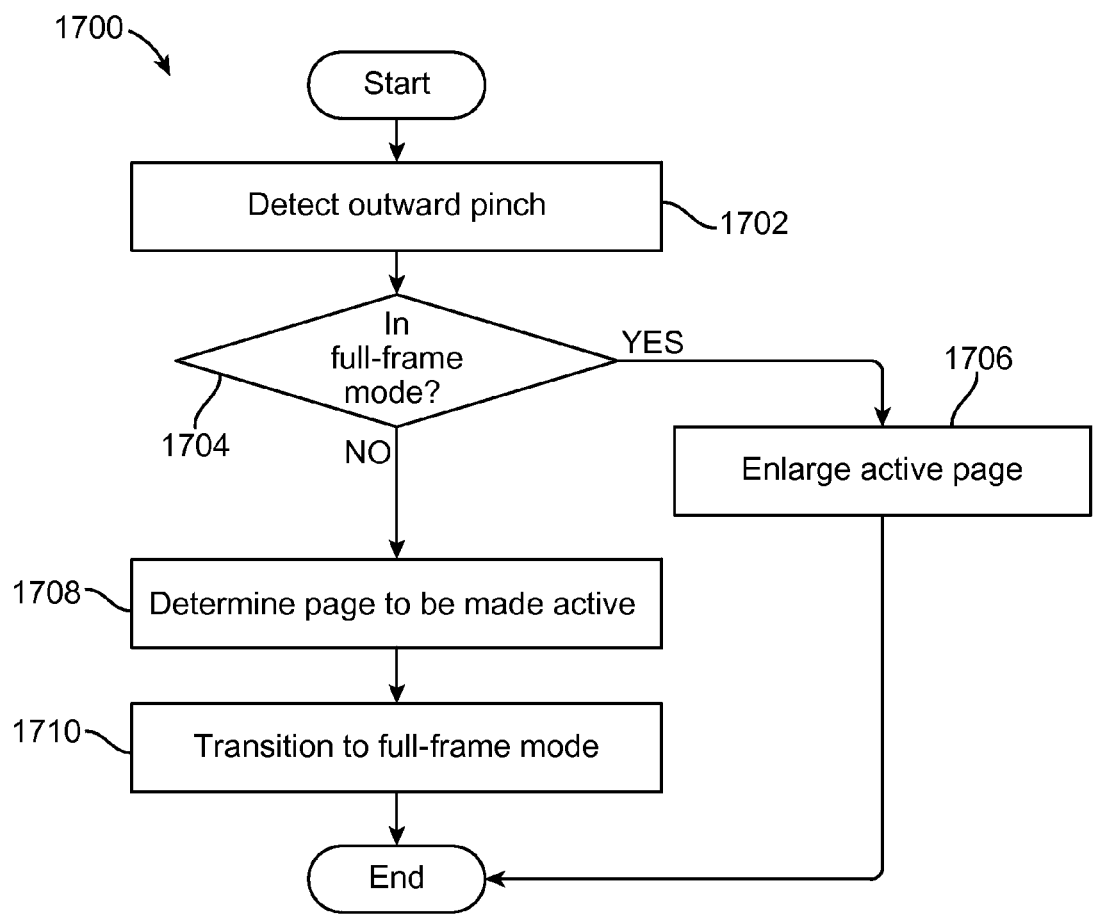
FIG. 17 is a flow diagram of a process for interpreting an outward-pinch gesture according to an embodiment of the present invention.

FIG. 17 is a flow diagram of a process 1700 for interpreting an outward-pinch gesture according to an embodiment of the present invention. Process 1700 can be executed, e.g., in browser application 145.

At block 1702, process 1700 can detect an outward pinch. For example, an operating system of the computer system may send a signal to the browser indicating that an outward pinch was detected. Alternatively, browser application 145 can receive data from the touch surface and interpret the data directly.

At block 1704, process 1700 determines whether browser application 145 is in full-frame mode. If so, then the outward pinch is interpreted as a request to zoom the active content item, and at block 1706, the active content item is re-rendered at a larger size. (The degree by which the item is enlarged can depend on the size and/or velocity of the pinch.)

If, at block 1704, browser application 145 is not in full-frame mode, then the outward pinch is interpreted in the context of array mode, in which context the outward pinch is interpreted as a request to transition to full-frame mode. Accordingly, at block 1708, process 1700 can determine which content item should become the active item. For example, if the outward pinch is not associated with any particular content item, the item closest to center in the page-display area can be selected. Or, if the outward pinch is associated with a particular content item, then that item can be selected. At block 1710, process 1700 can transition browser application 145 to full-frame mode with the active item as determined at block 1708.

Figure 18:
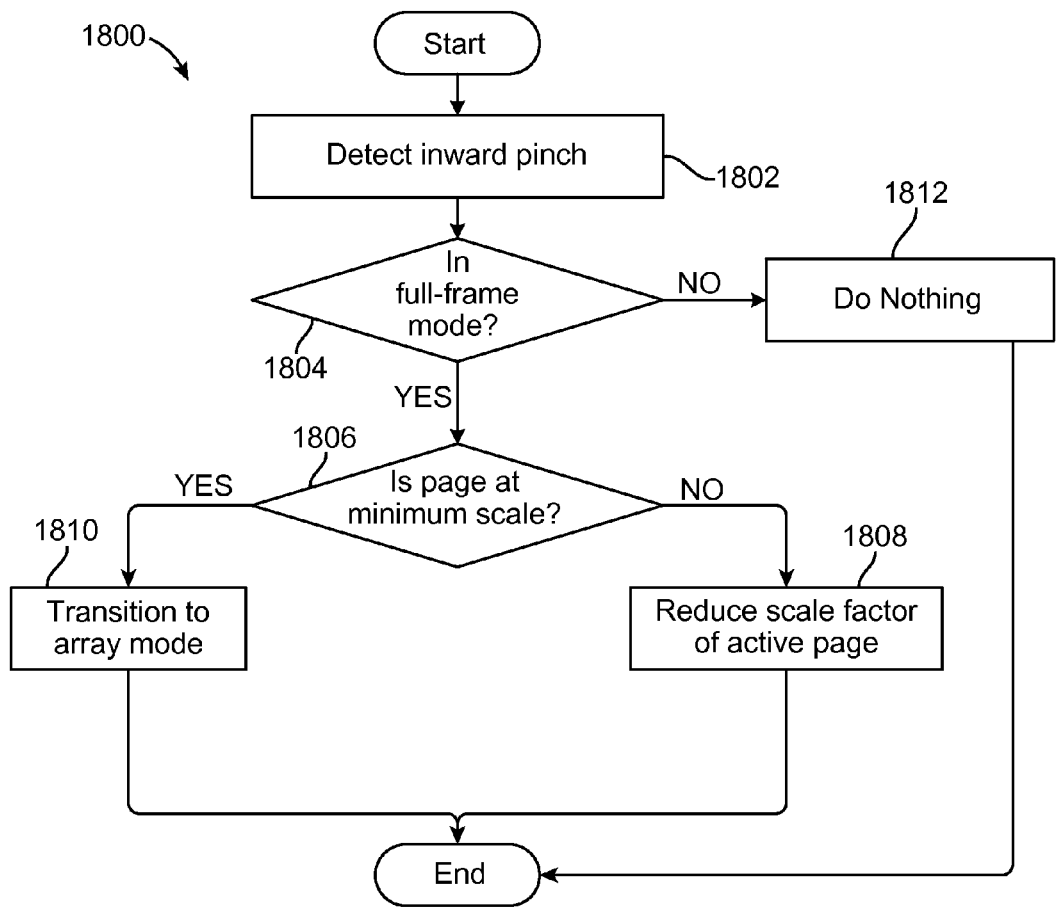
FIG. 18 is a flow diagram of a process for interpreting an outward-pinch gesture according to an embodiment of the present invention.

FIG. 18 is a flow diagram of a process 1800 for interpreting an inward-pinch gesture according to an embodiment of the present invention. Process 1800 can be executed, e.g., in browser application 145.

At block 1804, process 1800 can detect an inward pinch. For example, an operating system of the computer system may send a signal to the browser indicating that an inward pinch was detected. Alternatively, browser application 145 can receive data from the touch surface and interpret the data directly.

At block 1804, process 1800 determines whether browser application 145 is in full-frame mode. If so, process 1800 determines whether the active content item is currently rendered with a minimum scale factor. (For example, the scale factor may be limited to always being at least 1.0 so that items in full-frame mode are always rendered at 100% or more of actual size. Other minimums can also be used, e.g., 0.5 to allow reduction to 50% of actual size.) If the scale factor is larger than the minimum, then the inward pinch is interpreted as a request to zoom out. Accordingly, at block 1808, process 1800 can re-render the active page with a smaller scale factor. (The degree by which the scale factor is reduced can depend on the size and/or velocity of the pinch, and the new scale factor can be constrained by the minimum.)

If, at block 1806, the item is currently rendered with the minimum scale factor, then the inward pinch is interpreted as a request to enter array mode, and at block 1810, process 1800 can initiate a transition to array mode.

In this example, the inward-pinch gesture has no defined meaning in array mode. Accordingly, if, at block 1804, browser application 145 is in array mode, process 1800 can do nothing (block 1812). In some embodiments, process 1800 may execute a visual effect to indicate to the user that the gesture was received but has no effect. For example, a rubber-band-type visual effect can be used to show the content items in the array shrinking briefly, then quickly springing back to standard size. In other embodiments, the inward pinch gesture can have a defined meaning in array mode (e.g., shrinking the size of each content item to allow more items to be simultaneously visible), and block 1812 can include any actions associated with implementing the defined meaning.

It will be appreciated that these gesture-interpretation processes are illustrative and that variations and modifications are possible. Steps described as sequential may be executed in parallel, order of steps may be varied, and steps may be modified, combined, added or omitted. Further, while the processes as described assume that the browser has only two relevant modes (full-frame and array modes), some browsers may offer additional modes that affect the interpretation of a pinch gesture; the processes of FIGS. 17 and 18 can be modified to support additional context-dependent interpretations.

Figure 19:
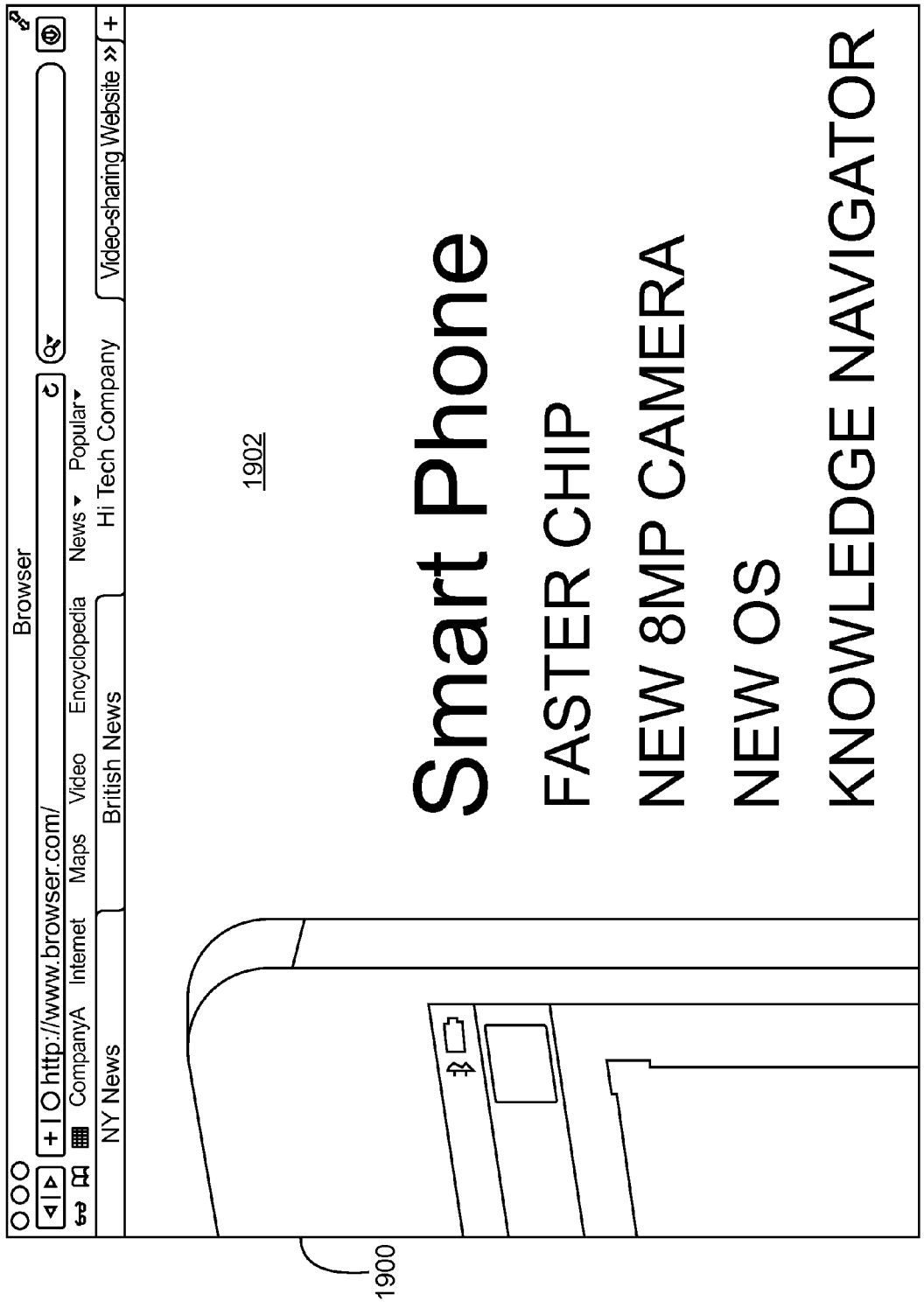
FIGS. 19-21 are screen images illustrating an effect of the gesture interpretation processes of FIGS. 17 and 18.
Figure 20:
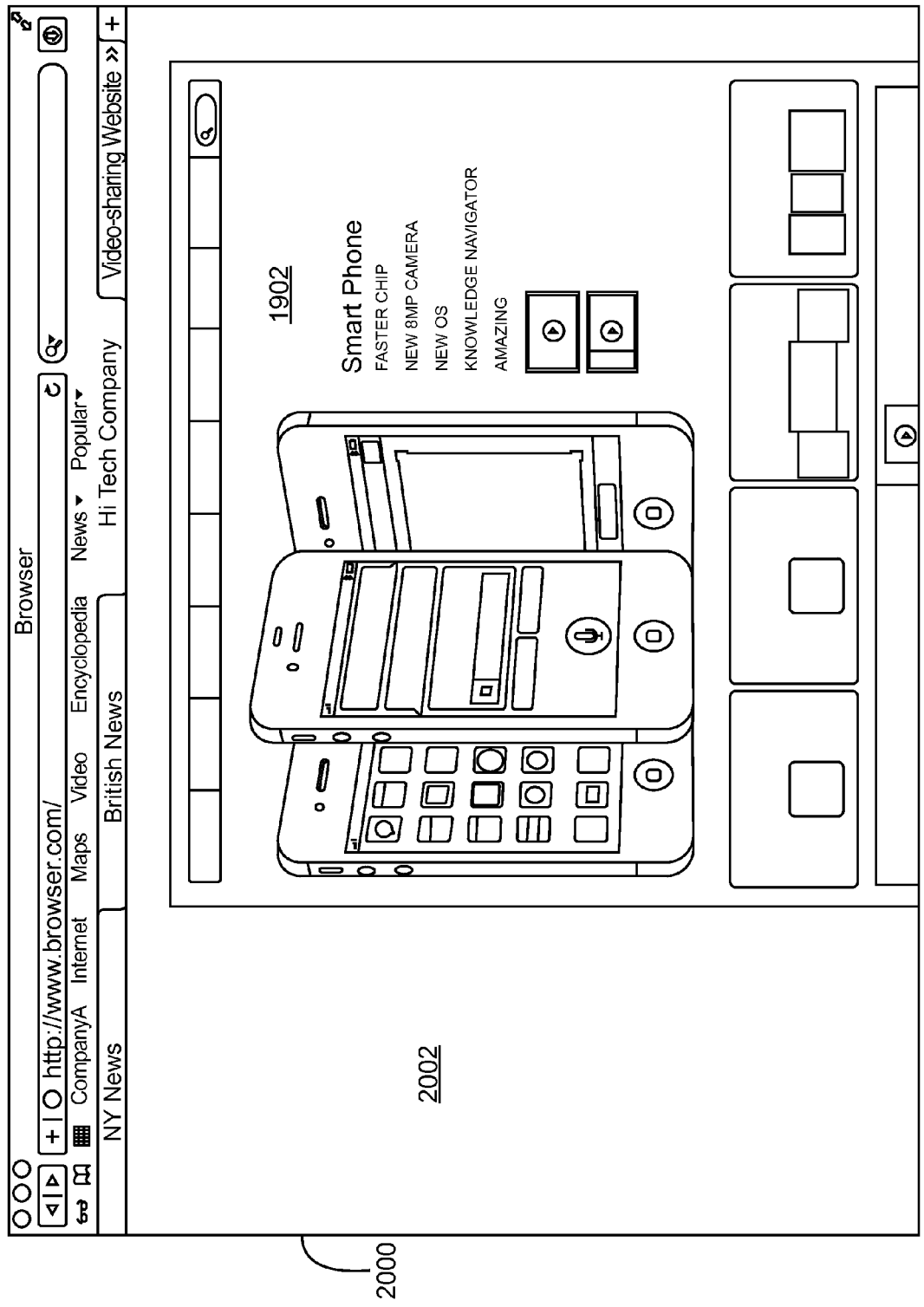
Figure 21:
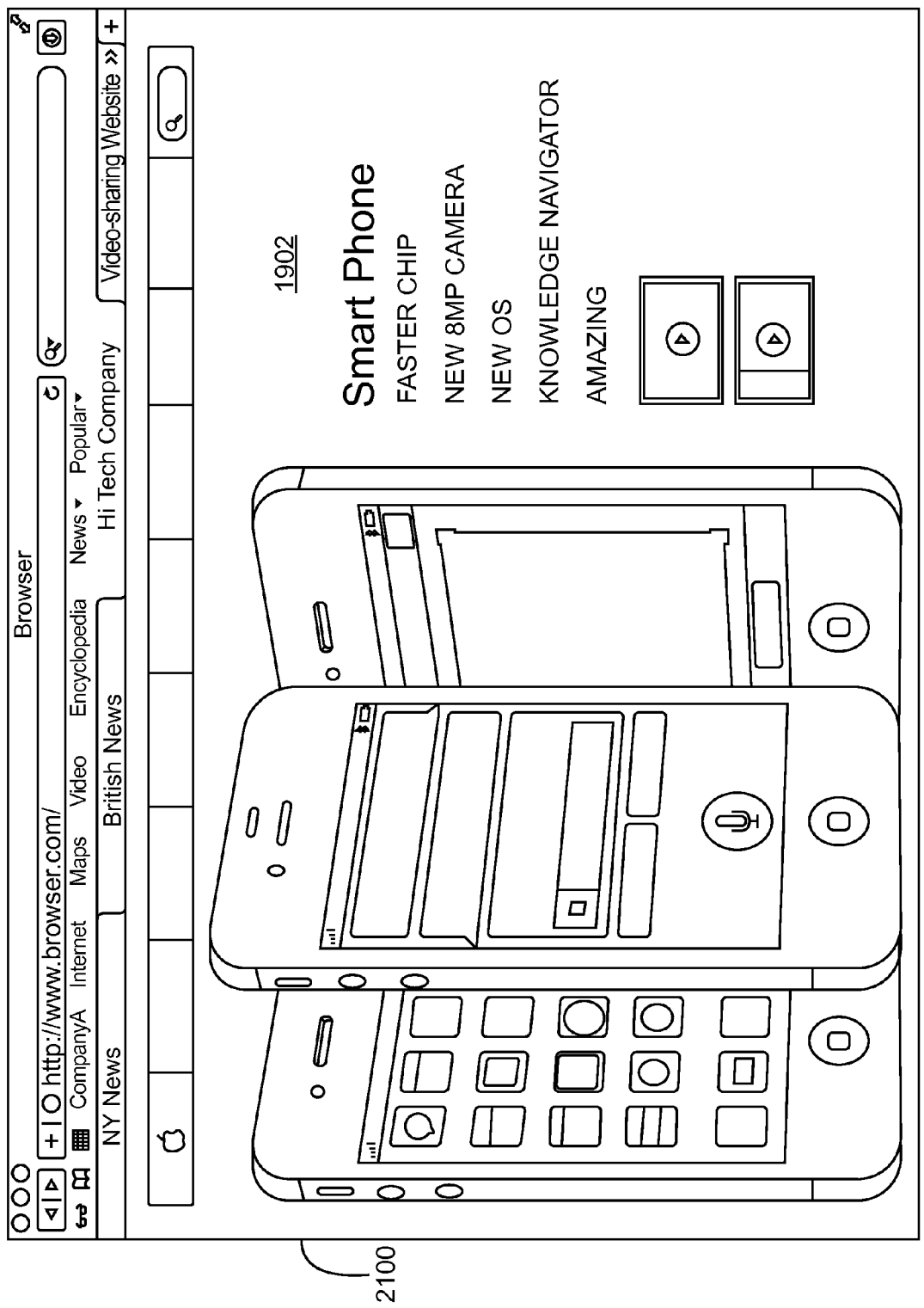

FIGS. 19-21 are screen images illustrating the effect of the gesture interpretation processes of FIGS. 17 and 18. FIG. 19 illustrates a browser screen 1900 in full-frame mode, with a page 1902 that is rendered in an enlarged format (scale factor greater than 1.0). At this point, an inward-pinch gesture is detected. The inward pinch shrinks page 1902 to a new scale factor. In one embodiment, the new scale factor is limited to being not less than 1.0, and if the input and current scale factor are such that the pinch gesture requests a reduction to a scale-factor less than 1.0, the browser can simply set the new scale factor to 1.0. When this happens, a visual cue can be used to signal the user that a zoom limit has been reached. For example, as illustrated in FIG. 20, page 1902 can be shown as shrinking to occupy less than the full page-display area 2002. (This can be suggestive of a transition to array mode but in this example, the mode is not changing.) Then, page 1902 can snap back to full-frame mode at scale factor 1.0 as shown in FIG. 21. This sequence of events can provide a visual cue the user that the page is now at its minimum scale factor and that a further inward pinch will result in entering array mode.

Thus, if the active page is zoomed in, a user can enter array mode with two inward pinches: one pinch to return to full-frame mode at scale factor 1.0 and a second pinch to switch modes.

Sometimes, a user may not need to browse through all open tabs but may simply desire to switch to an adjacent tab. Browser application 145 can support switching tabs while in full-frame mode via mechanisms such as selecting a different tab 206 in browser screen 200 (FIG. 2). However, depending on the particular user interface, selecting a tab can be cumbersome. Accordingly, some embodiments of the present invention provide a gesture that can be interpreted as switching to an adjacent tab, leveraging the array mode and associated gestures described above.

Figure 22:
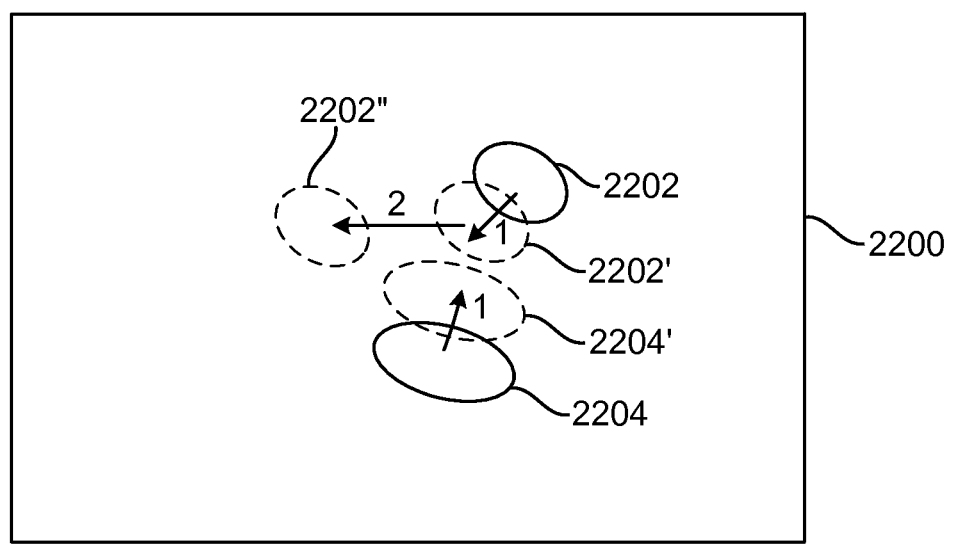
FIG. 22 illustrates contact areas on a touch-sensitive surface for a pinch-swoop gesture according to an embodiment of the present invention.

In some embodiments, a "pinch-swoop" gesture can be defined as illustrated in FIG. 22. This gesture can occur in two stages, as indicated by the numbered arrows. Stage 1 can be much like the inward pinch of FIG. 15: two contact areas 2202 and 2204 are detected on touch-sensitive surface 2200 at initial positions, then are detected moving toward each other, e.g., to positions 2202' and 2204' as shown. (As with the inward pinch, either or both of the contact areas can move as long as the net movement decreases the distance between the contact areas.) In stage 2, at least one of the contact areas moves linearly; in this example, the contact area at 2202' moves to 2202". In some embodiments, it does not matter whether the second contact area (area 2204') remains in contact during stage 2, as long as at least one of the two areas remains in contact throughout the duration of the gesture. Either area can be the one that moves during stage 2, or both areas can remain in contact and move in roughly the same direction. The movement during stage 2 can be in any direction, and the interpretation of the gesture can depend in part on the direction of that movement. The pinch-swoop gesture can be executed in a single continuous movement; the user need not pause between stage 1 and stage 2 so long as pinching and translational or directional movement can both be detected.

Figure 23:
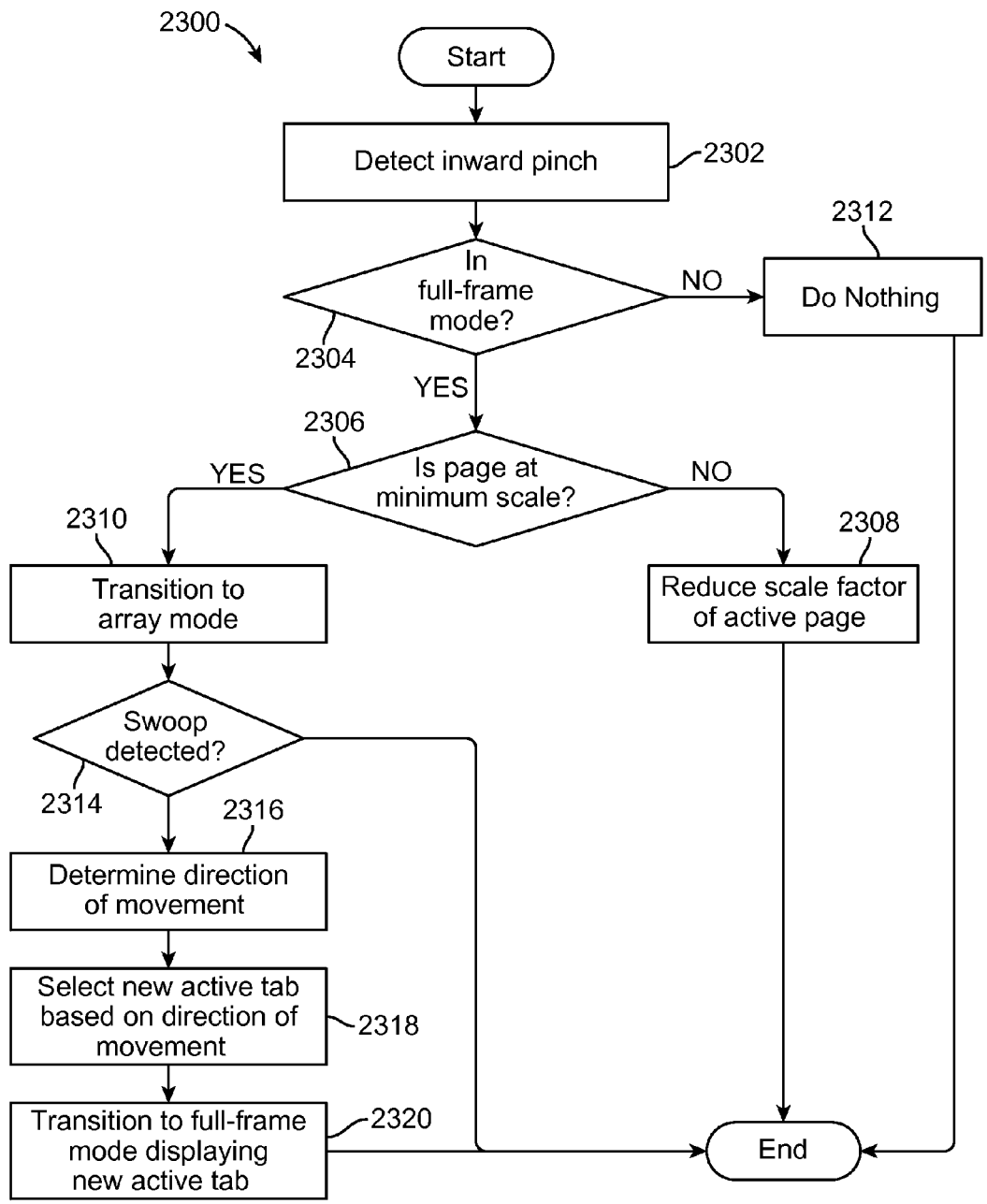
FIG. 23 is a flow diagram of a process that can be used to interpret inward-pinch and pinch-swoop gestures according to an embodiment of the present invention.

In some embodiments, the pinch-swoop gesture illustrated in FIG. 22 can be used to provide a quick interface for switching between adjacent tabs in a browser. FIG. 23 is a flow diagram of a process 2300 that can be used to interpret inward-pinch and pinch-swoop gestures according to an embodiment of the present invention. Process 2300 is similar to process 1800, and blocks 2302-2312 can be implemented similarly to blocks 1802-1812 described above. At block 2314, after switching to array mode at block 2310, process 2300 determines whether stage 2 (movement) of a pinch-swoop gesture has been detected. If not, then process 2300 can end, leaving browser application 145 in array mode.

If a pinch-swoop stage 2 movement has been detected, then at block 2316, process 2300 can determine the direction of the stage 2 movement. At block 2318, process 2300 can select a new active tab based at least in part on the direction of the movement. For example, suppose that at block 2304, browser application 145 was in full-frame mode as shown in FIG. 2, with tab 206a being the active tab. Tab 206b is adjacent to tab 206a on the right, and tab 206c is adjacent to tab 206a on the left. If the movement at block 2316 is to the right, then tab 206b (the adjacent tab to the right of the most recent active tab 206a) can be selected; if the movement is to the left, then tab 206c (the adjacent tab to the left of the most recent active tab 206a) can be selected. In some embodiments, if there are no open tabs adjacent to the most recent active tab in the indicated direction, the most recent active tab can remain the active tab. In other embodiments, if there are no open tabs adjacent to the most recent active tab in the indicated direction, the gesture can be interpreted as requesting that a new tab be opened, and the new tab (which can initially display an empty page or a default page as desired) becomes the active tab.

Referring again to FIG. 23, at block 2320, after the new active tab has been selected, browser screen 200 can transition to full-frame mode, displaying the new active tab. The transition can be animated; for example, array 300 of FIG. 3 can be shown sliding into the new position (with the new active tab approximately centered in the page-display area) prior to the transition to full-frame mode.

It will be appreciated that process 2300 is illustrative and that variations and modifications are possible. Steps described as sequential may be executed in parallel, order of steps may be varied, and steps may be modified, combined, added or omitted. In some embodiments, the entire process can be executed quickly, essentially in time with the user making the pinch-swoop gesture (within the limits of human perception) so that the user perceives a quick switch from one tab to an adjacent tab in response to a single pinch-swoop gesture. Depending on other aspects of the user interface of the browser application, this tab-switching technique can be more efficient than directly selecting the new tab.

In some embodiments, the transition from full-frame to array mode and back can be used to animate any transition between one active tab and another, regardless of the particular user input that triggered the transition. For example, when the user selects a tab in tab area 205 of browser screen 200 in FIG. 2, the transition to the selected tab can be animated as a transition into array mode, a scrolling of the array to the new position, and a transition back to full-frame mode with the selected tab as the active tab. Thus, the user input need not include an explicit user request to enter array mode or to return to full-frame mode; the mode transitions can be incorporated into the browser's response to any tab-switching input the browser receives.

Figure 24:
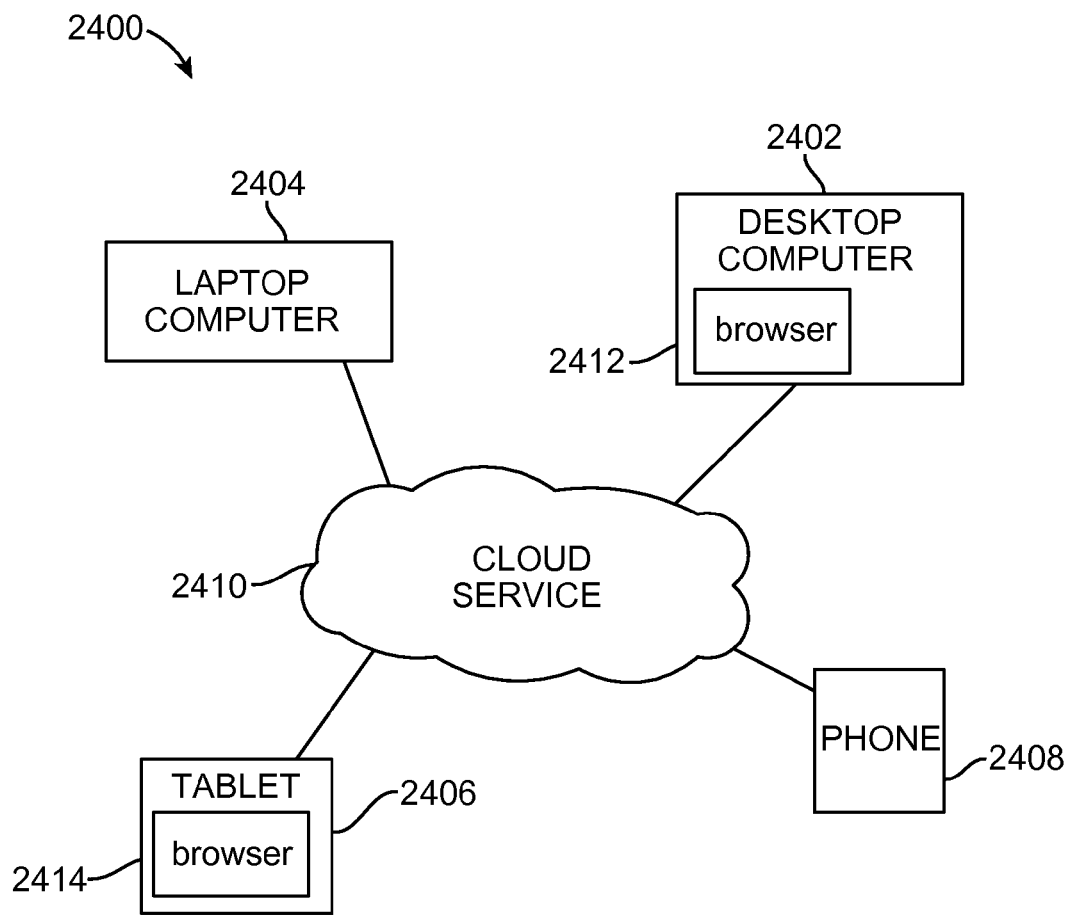
FIG. 24 illustrates a cloud computing setup for a user according to an embodiment of the present invention.

In some embodiments, a browser application's array mode can be used to facilitate user access to tabs that may be open in content browser applications on a user's other devices. For example, a user may subscribe to a cloud-based data management service that automatically synchronizes information among multiple devices belonging to that user. FIG. 24 illustrates a cloud computing setup 2400 for a user according to an embodiment of the present invention. In this example, the user has a desktop computer 2402, a laptop computer 2404, a tablet computer 2406, and a smart phone

2408. (It is to be understood that a given user can have any number and combination of these and/or other devices.) Devices 2402-2408 are each registered with cloud service 2410, which provides data storage and synchronization capabilities. Devices 2402-2408 may communicate with cloud service 2410, e.g., via the Internet, cellular data networks, or other communication channels. The communication may be effectively continuous (e.g., for real-time synchronization of devices), or sporadic (e.g., a scheduled synchronization operation or a discrete data-access operation).

Any or all of devices 2402 can execute a browser application (e.g., a web browser) that supports tabbed browsing. In this example, desktop 2402 can execute a tabbed browser 2412, while tablet 2406 can execute a tabbed browser 2414. Browsers 2412 and 2414 can be implemented using the same software or different software. In some embodiments, the user can use browser 2412 to view tabs that are open in browser 2414 as well as tabs that are open locally in browser 2412 and/or vice versa. As used herein, a "local tab" (or "local content item") refers to a tab (or other content item) that is open in the browser application the user is currently using, while a "remote tab" (or "remote content item") refers to a tab (or other content item) that is open in a browser application on one of the user's other devices. Thus, for example, if the user is using browser 2414 on tablet 2406, tabs the user has opened with browser 2414 are "local" while any tabs that may be open in browser 2412 are "remote." If, instead, the user is using browser 2414, the nomenclature would be reversed, with tabs in browser 2414 being "local" and tabs in browser 2412 being "remote."

In some embodiments, a tab can be considered as being open in a browser even if the browser application is not currently executing on its host device. For example, some browsers can save the currently open set of tabs when the browser program exits; this behavior can be either automatic or controlled by user input. In instances where tabs are saved upon exit, a saved set of remote tabs can be accessed even if the remote device is not currently executing its browser application. For purposes of implementing remote-tab browsing, it is sufficient that cloud service 2410 be capable of obtaining information from a first one of the user's devices as to what tabs are currently open on that device and providing that information to one of the user's other devices (e.g., on request).

Figure 25:
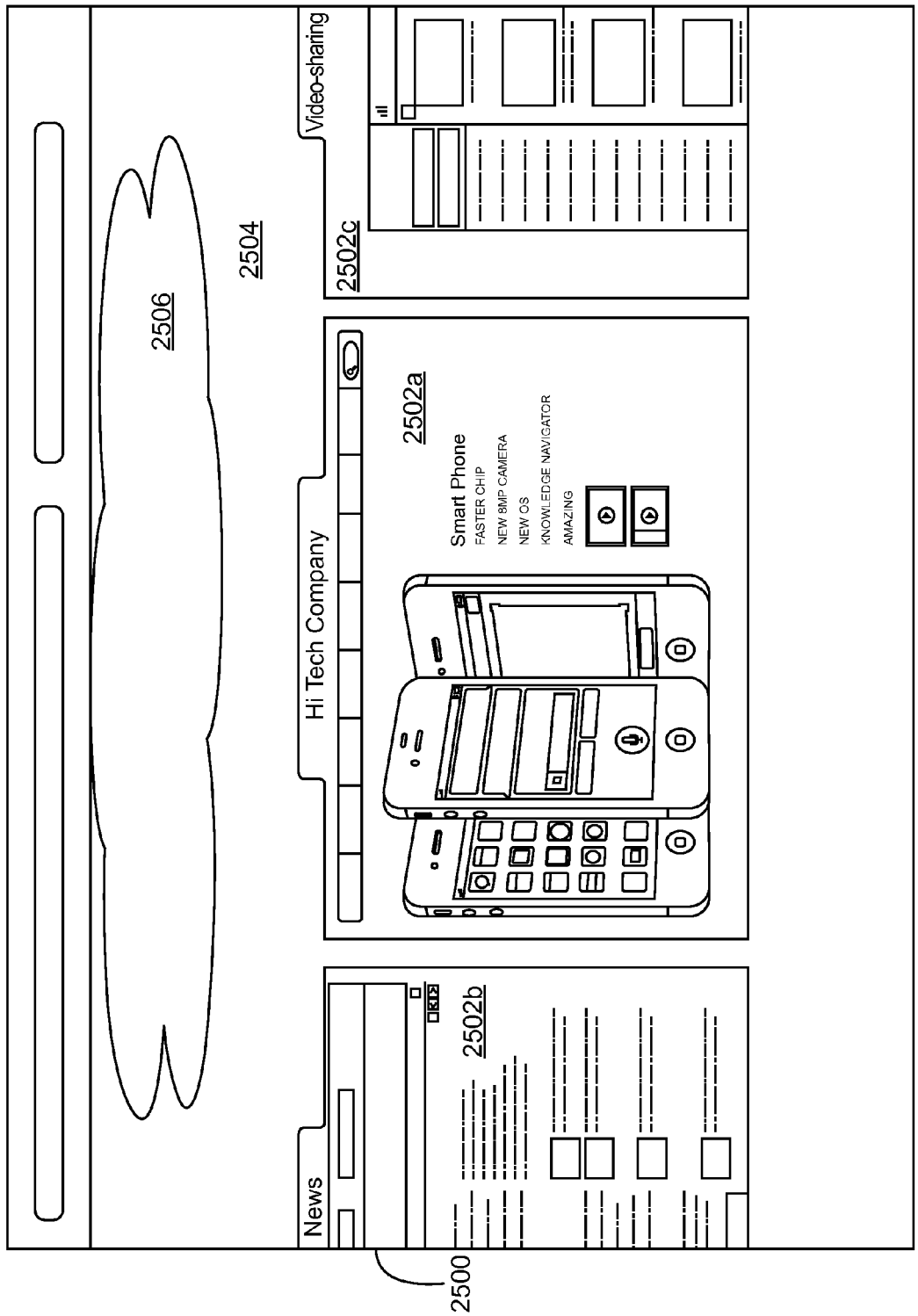
FIG. 25 illustrates a browser screen for a browser in array mode according to another embodiment of the present invention.
Figure 26:
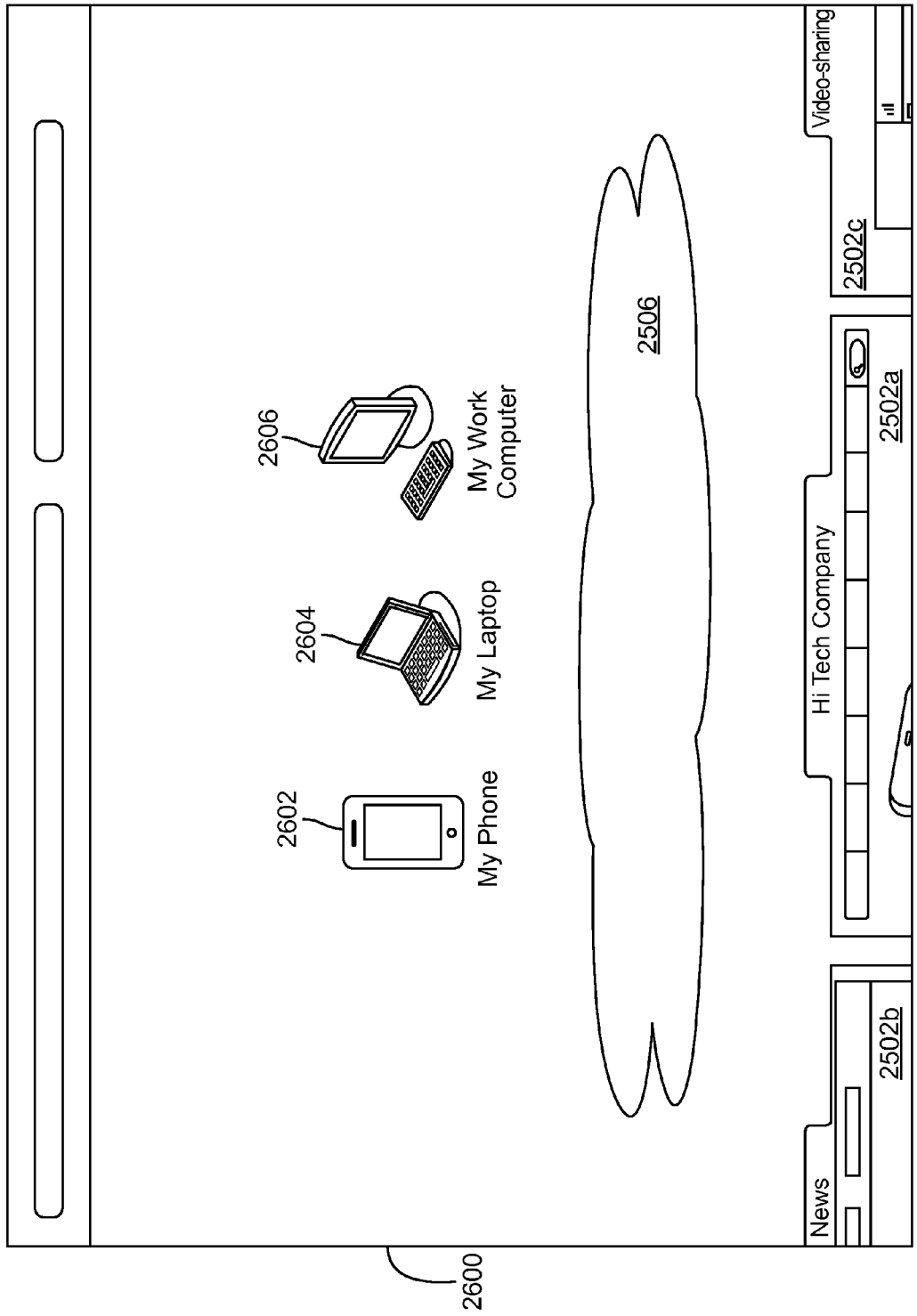
FIG. 26 illustrates a browser screen that can be used to access remote tabs according to an embodiment of the present invention.
Figure 27:
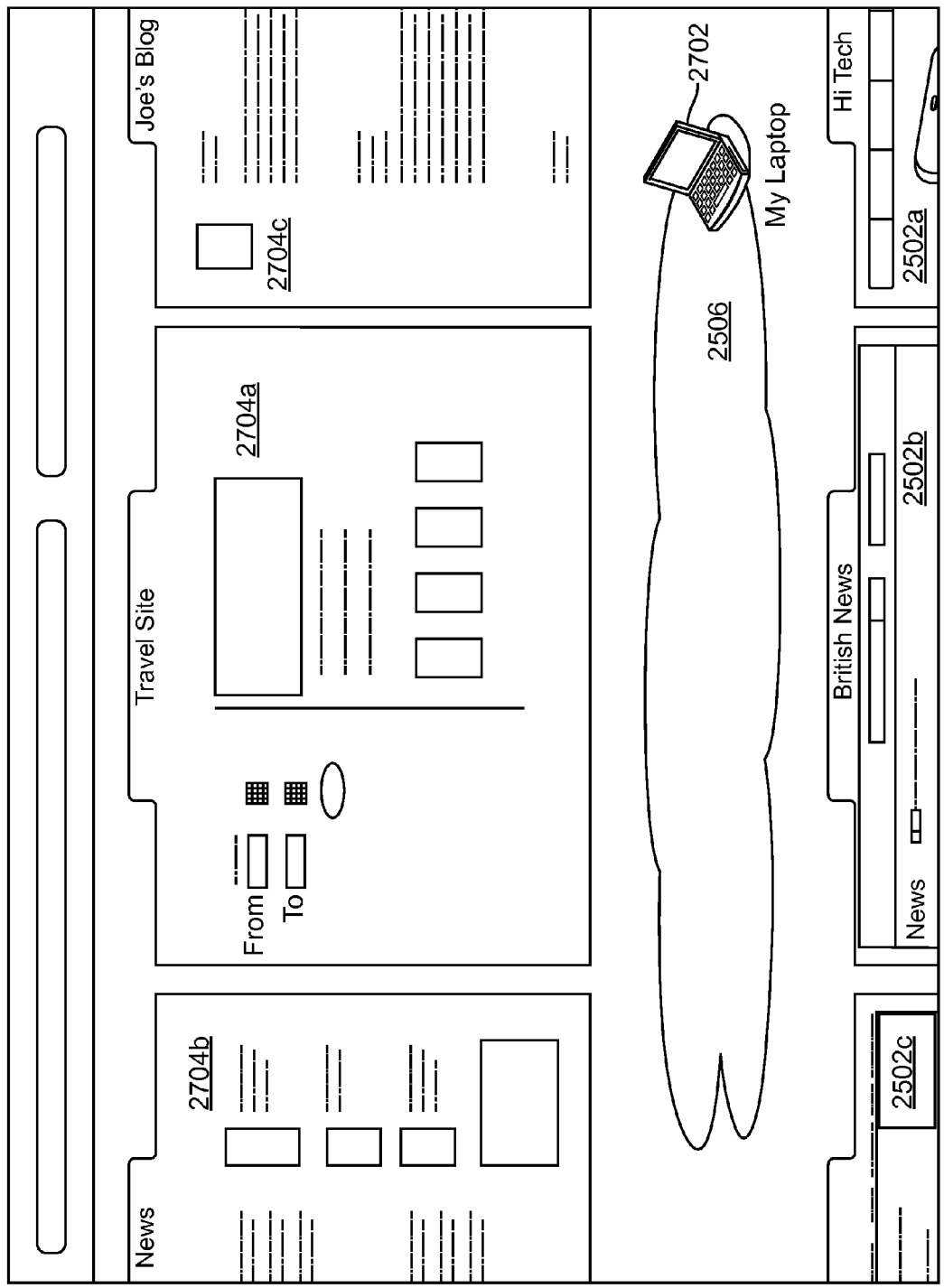
FIG. 27 illustrates another browser screen that can be used to access remote tabs according to an embodiment of the present invention.

FIGS. 25-27 illustrate the user experience of remote-tab browsing according to an embodiment of the present invention. For purposes of describing these figures, it will be assumed that the user is using browser 2414 on tablet 2406 of FIG. 24 and desires to access remote tabs that are open in browser 2412 on desktop computer 2402.

FIG. 25 illustrates a browser screen 2500 for a browser application (e.g., browser application 2414 on tablet 2406) in array mode. The local tabs are shown as an array of tabbed pages 2502; the array can be similar to array layouts described above. At the top of page display area 2504, a cloud 2506 is partially visible. In some embodiments, cloud 2506 is shown only if access to data on the user's remote devices is currently available (e.g., if tablet device 2406, on which browser 2414 is running, is currently connected to the cloud service, if the user has multiple devices registered with the cloud service, and if any of the user's other devices has any open tabs). Thus, the presence of cloud 2506 can indicate to the user that cloud service 2410 has access to remote tabs on one or more of the user's other devices.

The user can interact with browser screen 2500 in the manner described above to view and select any local tab. In addition, the user can choose to access remote tabs. For example, in addition to scrolling the array from side to side, the user can scroll the array up (or down).

FIG. 26 illustrates a browser screen 2600 that can be displayed if the user scrolls up in browser screen 2500 of FIG. 25. Local tabs (pages 2502) scroll to the bottom, cloud 2506 becomes fully visible, and above cloud 2506 are shown icons corresponding to the user's other devices. For example, icon 2602 can correspond to smart phone 2408 (FIG. 24), icon 2604 to laptop computer 2404, and icon 2606 to desktop computer 2402. Each icon can include a label identifying the device, e.g., by a user-assigned name. The user can select one of the icons 2602, 2604, 2606 to view the remote tabs from that device.

FIG. 27 illustrates a browser screen 2700 that can be displayed if the user selects icon 2602 in browser screen 2600 of FIG. 26. The lower portions of the page display area remain as before, and an icon 2702 is added to identify the selected device (in this example, desktop computer 2402). Tabbed pages 2704 provide an array of pages corresponding to the remote tabs for the selected device; in this example, the selected device is desktop computer 2402 and the remote tabs are the tabs that happen to be open in browser 2412. The remote-tab array can be a 1×M strip, where M is the number of open pages on the selected device. Tabbed pages 2704 can be arranged in the same order as the tabs in browser 2412, and the array can be positioned such that tabbed page 2704*a*, which is nearest the center in browser screen 2700, corresponds to the current (or most recent) active page in browser 2412. The user can interact with tabbed pages 2704 in the same manner as the tabbed-page array described above, including expanding any one of pages 2704 into full-frame mode. The user can also select cloud 2506 to return to screen 2600 and select a different remote device, or scroll down to access the local tabs (pages 2502).

Figure 28:
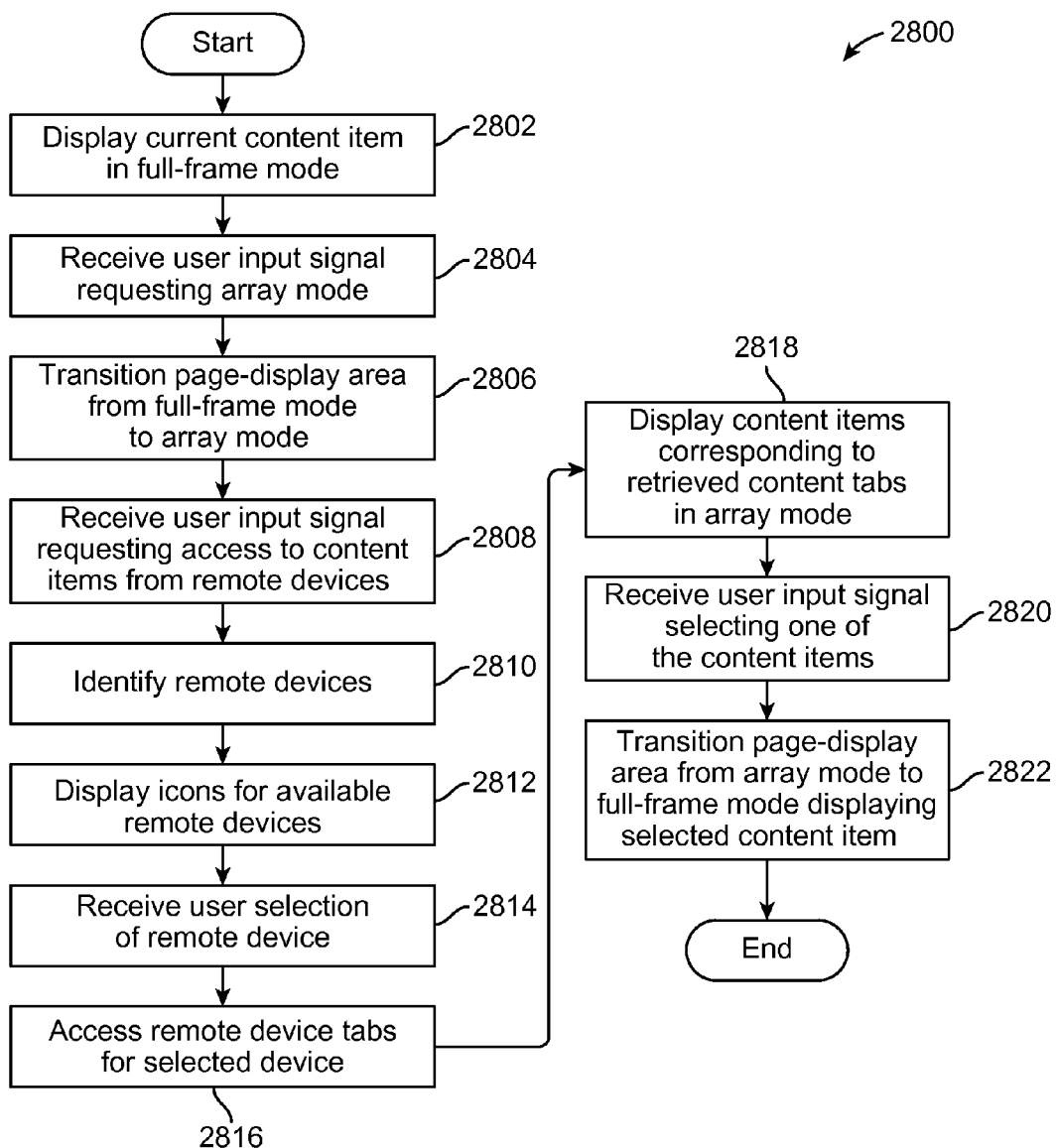
FIG. 28 is a flow diagram of a process for browsing of remote tabs according to an embodiment of the present invention.

FIG. 28 is a flow diagram of a process 2800 for remote-tab browsing according to an embodiment of the present invention. Process 2800 can start at block 2802 with the browser (e.g., browser 2414 of FIG. 24) displaying a content item in full-frame mode. At block 2804, process 2800 can receive user input requesting a transition to array mode. At block 2806, process 2800 can transition to array mode, e.g., as described above. In some embodiments, the array mode can include cloud indicator 2506 (FIG. 25) or another visual indicator that remote tabs are available.

At block 2808, process 2800 can receive a user input requesting access to tabs from the user's remote devices. For example, in FIG. 25, the user can select cloud 2506 or scroll up.

At block 2810, process 2800 can identify the user's remote devices. For example, process 2800 can communicate with cloud service 2410 (FIG. 24) to determine what devices the user has and whether those devices have open tabs. At block 2812, process 2800 can display icons for the user's remote devices, e.g., as shown in FIG. 26. In some embodiments, an icon for a particular device is only shown if the device is registered with cloud service 2410 and has open tabs. In some embodiments, if a device is registered but does not have open tabs that are accessible to cloud service 2410, the icon can be drawn in a grayed-out, faded, or otherwise visually distinct format to indicate that no tabs are available.

At block 2816, process 2800 can retrieve the remote tabs for the selected device. In some embodiments, process 2800 can communicate with cloud service 2410 to obtain the current data on what tabs are open for the selected device and what page(s) each tab contains. Cloud service 2410, in turn, can obtain the data from the selected device, either in response to a request from process 2800 or by retrieving the data from a cache or other store of data obtained from the selected device during a previous synchronization operation.

In some embodiments, the data retrieved at block 2816 can include just the current page associated with each tab; in other embodiments, a complete or partial browsing history can also be provided for each tab. The data can include an identifier of the page (e.g., a URL) and/or a rendering of the page as it most recently appeared on the remote device.

In some embodiments, data retrieval at block 2816 can be subject to security measures. For example, before retrieving data related to remote devices, cloud service 2410 can require an access credential. The credential can be, e.g., a username and/or password (or passcode) associated with the user's account on cloud service 2410 or with the particular remote device whose data is being retrieved. Block 2816 can include additional prompts to the user to obtain appropriate credential information and/or additional communications with cloud service 2410 to provide the credential.

At block 2818, process 2800 can display content items corresponding to and representative of the remote tabs, based on the retrieved data. In some embodiments, process 2800 can use a retrieved URL to obtain and render the current content item for each tab. In other embodiments, the array-mode rendering of the remote tabs can just include a URL, title, thumbnail, or other identifier of the associated content item; the item is accessed only if the user selects it. (This can speed up rendering of the array-mode display of the remote tabs, as it would be expected that none of the content items for the remote tabs would currently be in the local browser's cache.)

At block 2820, process 2800 can receive user input selecting one of the remote tabs. This can be similar to selecting a local tab while in array mode as described above. Although other user-input options are not shown in FIG. 28, it is to be understood that the user input can request a different operation, e.g., selecting a different remote device or returning the display to the local tabs or the like, and that process 2800 can respond to such input by appropriately modifying the browser screen.

At block 2822, if the user selects a remote tab, process 2800 can transition the browser to full-frame mode displaying the selected item. In some embodiments, this can include retrieving the selected item.

In some embodiments, when the user selects a remote tab to view in full-frame mode, a new local tab is opened, and the full-frame view becomes a view of the local tabs, with the new local tab as the active tab. At this point the link between the new local tab and the remote tab from which it originated can be severed, and subsequent operations on the new local tab need not affect the remote tab set at all.

In other embodiments, when the user selects a remote tab to view in full-frame mode, the full-frame mode can incorporate the remote tabs in addition to or instead of the local tabs. For example, local tabs, remote tabs, or both can appear in the tab area of the browser screen. The remote tabs can be rendered in a different color and/or with other distinguishing markings so that the user can recognize that these are remote tabs. In some embodiments, any changes made in a remote tab (e.g., navigating to a new page, opening or closing tabs) can be synchronized back to the remote device via cloud service 2410.

In some instances, the remote and local browsers may access different versions of the same item. For instance, some web pages provide both a "standard" version optimized for devices with large displays such as desktop or laptop computers and a "mobile" version optimized for devices with small displays such as smart phones. In the case where the remote tabs are associated with one category of device (e.g., desktop computer 2402 of FIG. 24) while the local tabs are associated with a different category (e.g., smartphone 2408 or tablet 2406), the decision as to which version of the page is used can be made based on design considerations and/or user preferences. For example, in some cases, it may be desirable to mirror as closely as possible the browsing experience the user would have on the remote device, in which case the category of the remote device can be used to determine a version. In some cases, considerations related to bandwidth and/or display area may weigh in favor of rendering remote-tab pages based on the category of the local device. In some embodiments, if different versions of a page associated with a remote tab are available, the user can be prompted to indicate which version she wants to view.

It will be appreciated that the remote-browsing embodiments described herein are illustrative and that variations and modifications are possible. Different formats, color schemes, etc. can be used to distinguish between local and remote tabs in an array mode. In some embodiments, a user may be able to mark any local tab as "do not share," in which case the tab in question is not included in the remote tab set that is communicated to other devices; a user may also have the option to globally enable or disable tab sharing for the local tabs on any browser. It is also to be understood that remote-tab browsing capability is not required, and some browsers may support only local tabs.

Embodiments described above provide enhanced navigation between tabs in a content browser. By enabling a user to preview a content item associated with a particular tab and to move quickly among the content items associated with different tabs, the user's ability to select the tab she actually wants to view is enhanced. This can be helpful in many situations, such as where the user has a large number of tabs open and/or where multiple tabs display similar or identical labels in the full-frame view.

The particular configuration of display elements in array mode can be varied as desired. By way of example, FIGS. 29-33 are screen shots illustrating navigation among tabs in array mode using a "tab pile" metaphor that can be useful where there are many open tabs. The tab pile metaphor posits one pile of tabs to the left of the current tab and another pile of tabs to the right of the current tab. Within each pile, tabs are ordered such that the tabs closest to the current tab are nearest the top (if the user is looking down on the pile from above). The active tab sits on top of and between the two piles. Tabs shift left and right between the piles as the active tab changes.

Figure 29:
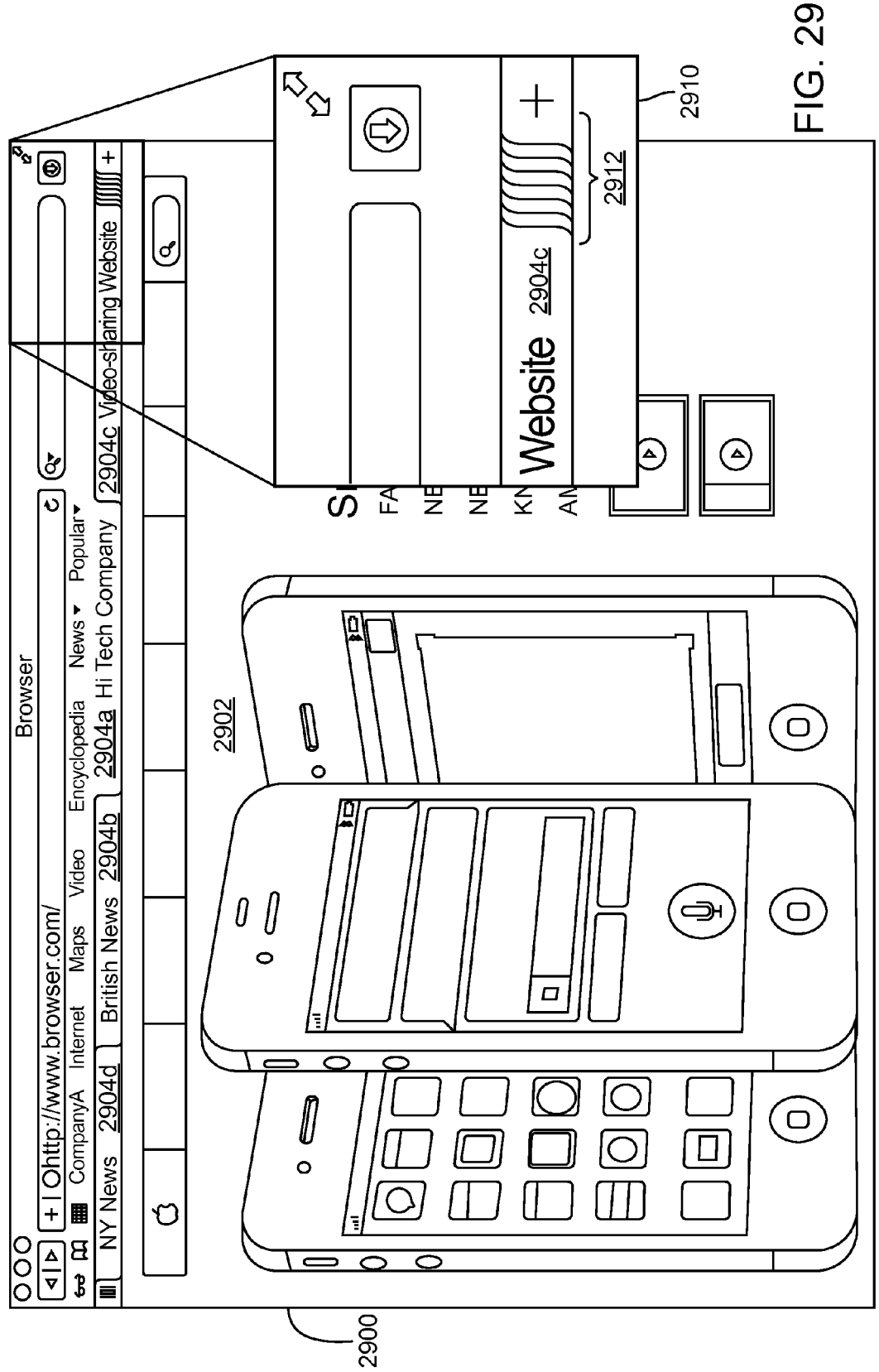
FIGS. 29-33 are screen shots illustrating navigation among tabs in array mode using a "tab pile" metaphor according to an embodiment of the present invention.

FIG. 29 illustrates a browser screen 2900 that implements a tab pile metaphor according to an embodiment of the present invention. A current page 2902 is shown in full-frame mode. A corresponding tab 2904*a* appears in front of adjacent tabs 2904*b*, 2904*c*. Tab 2904*b* overlaps the next adjacent tab 2904*d*. There is not enough space for additional tabs to the right of tab 2904*c*. Accordingly, as best seen in inset 2910, a tab pile 2912 is rendered to indicate that there are hidden tabs to the right of tab 2904*c*. In some embodiments, the number of tabs in tab pile 2912 can match the number of hidden tabs; in other embodiments, the number of tabs in tab pile 2912 can have an upper limit and can simply be an indicator that hidden tabs exist without necessarily indicating how many such tabs exist.

Figure 30:
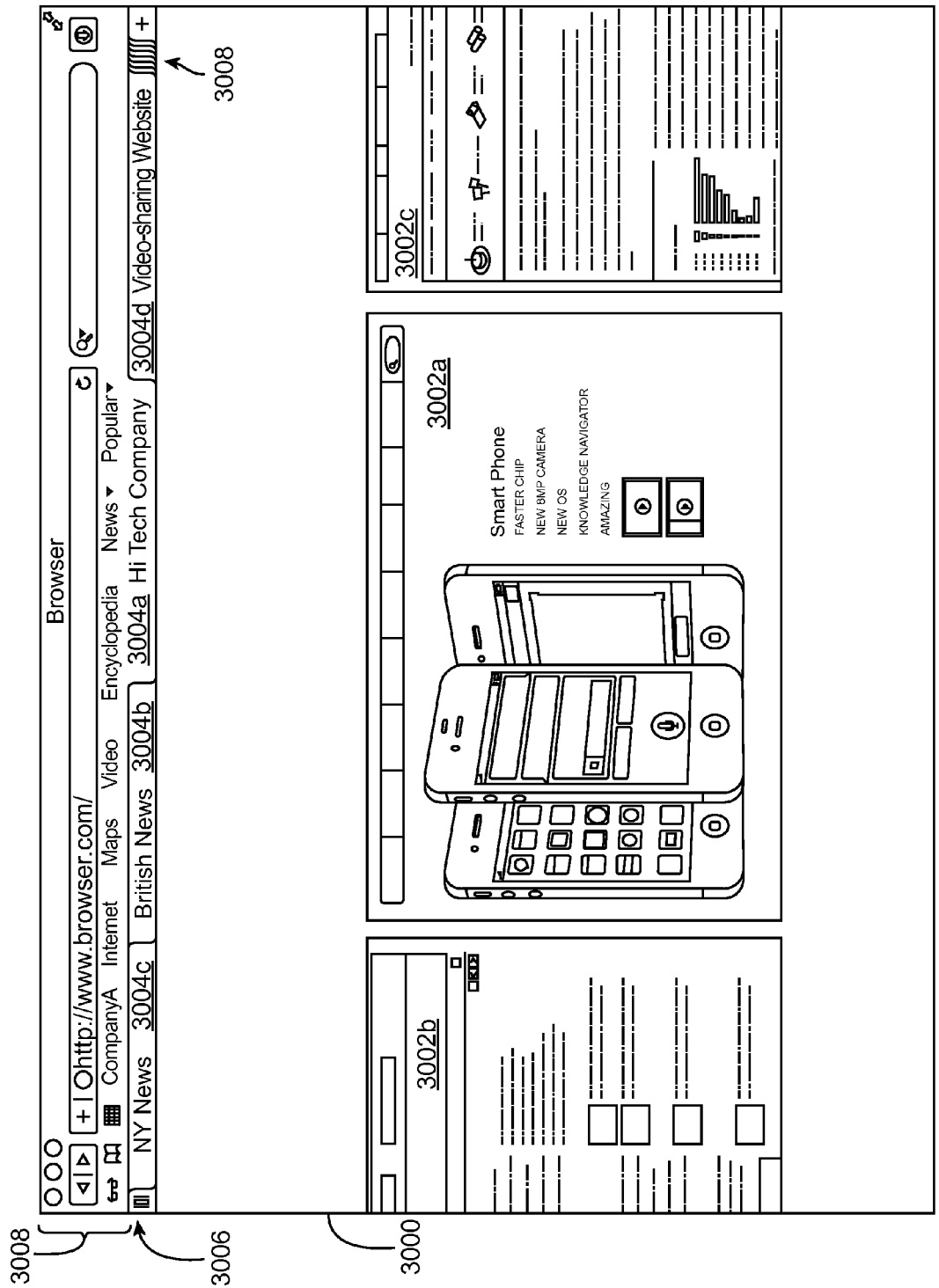

FIG. 30 illustrates a browser screen 3000 for an array mode corresponding to the full-frame mode of FIG. 29. As in other embodiments described herein, pages 3002 in array mode are rendered at reduced size and arranged side-by-side. Unlike the embodiment of FIG. 3, in this embodiment, pages 3002 do not have attached tabs. Tabs 3004 remain in tab area 3006 at the bottom of chrome 3008. Tab pile 3008 is shown near the right end of tab area 3006 to indicate hidden tabs.

Figure 31:
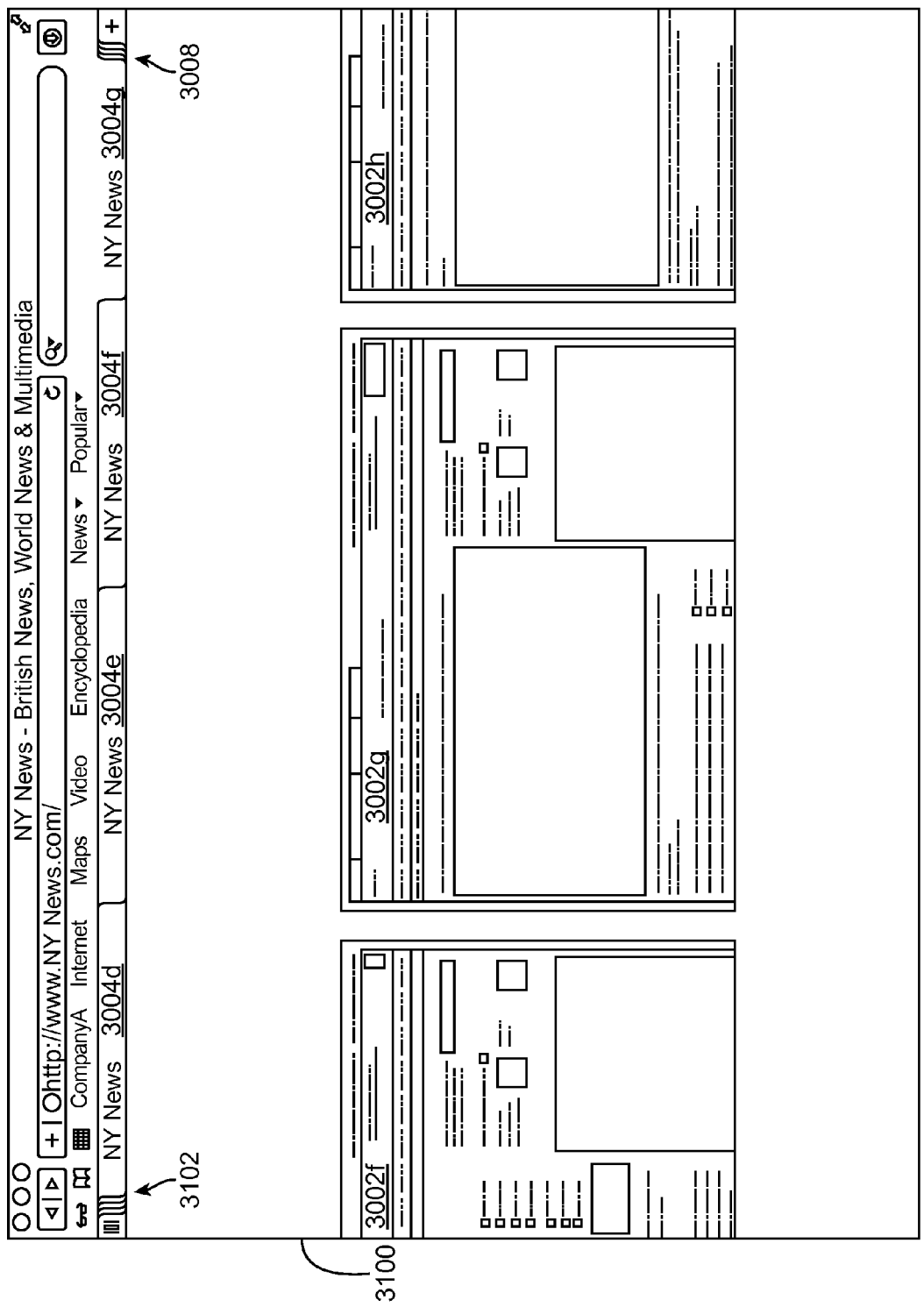

As the user scrolls the array of pages 3002, tab area 3006 is modified to reflect the current location with the array. For example, FIG. 31 illustrates a browser screen 3100 showing the array of pages 3002 after scrolling several pages to the right. Page 3002g is now nearest center. Tab area 3006 can reflect the shift. For example, tab 3004g (corresponding to page 3002g) is now on top of all other tabs, with adjacent tabs 3004f, 3004e, to the left. A tab pile 3102 has appeared near the left end of tab area 3006 to indicate that there are hidden tabs to the left (including, e.g., tabs 3002a-c, which were visible in FIG. 30). Tab pile 3008 near the right end of tab area 3006 is reduced in size, as some of its tabs are now visible.

Figure 32:
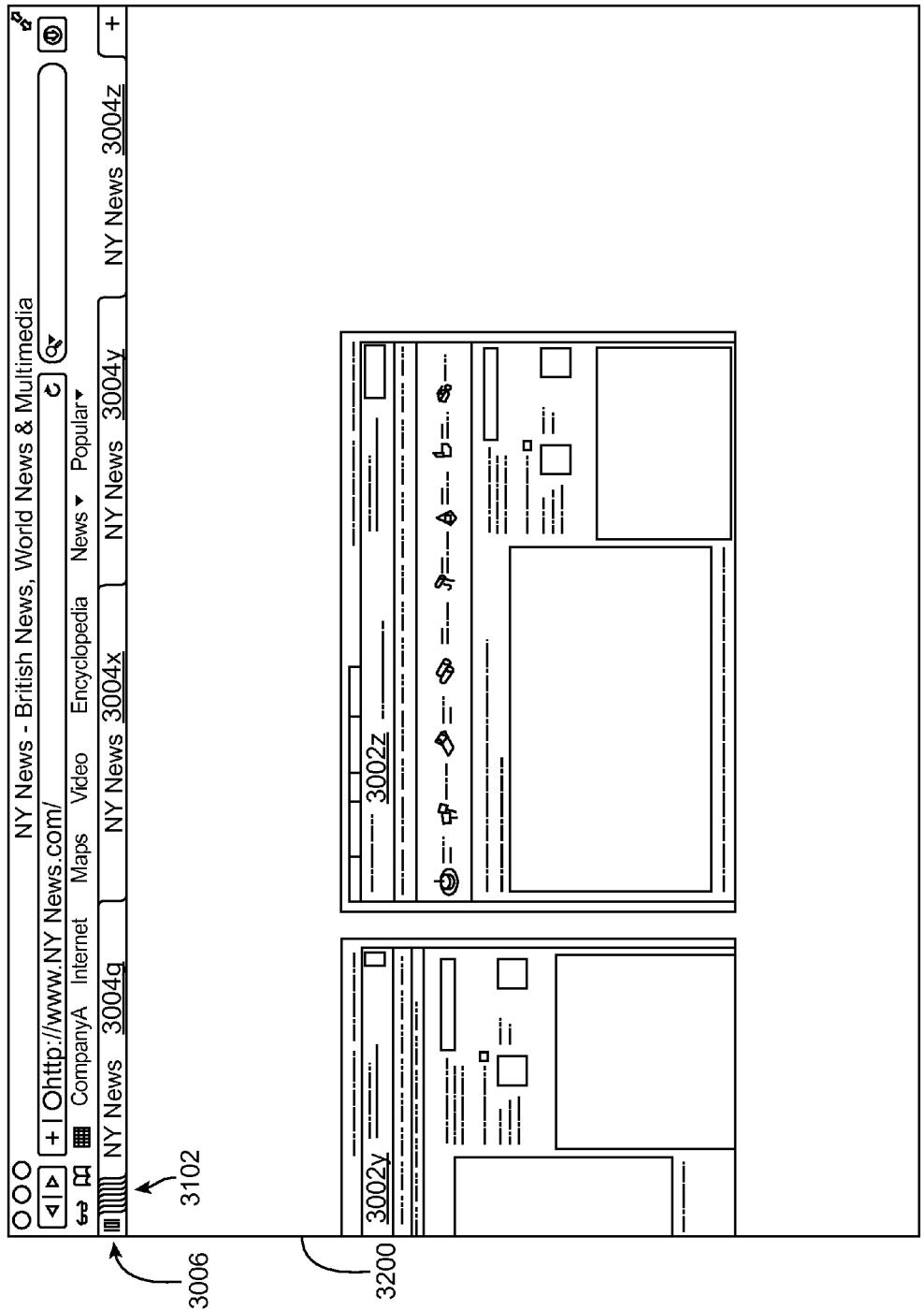

FIG. 32 illustrates a browser screen 3200 showing the array of pages 3002 after scrolling all the way to the right end. Page 3002z, corresponding to the rightmost tab 3004z, is near the center of page-display area 3202. The blank space to the right, where the next page would be expected to appear, is a cue that this is the right end of the array. (Scrolling can be end-limited to prevent a situation where no part of the array is visible.) In addition, tab 3004z is now drawn as the top tab in tab area 3006, and there are no tabs to the right (tab pile 3008 from FIG. 31 is gone). At the same time, left-end tab pile 3102 is larger, indicating an increase in the number of hidden tabs at the left.

Figure 33:
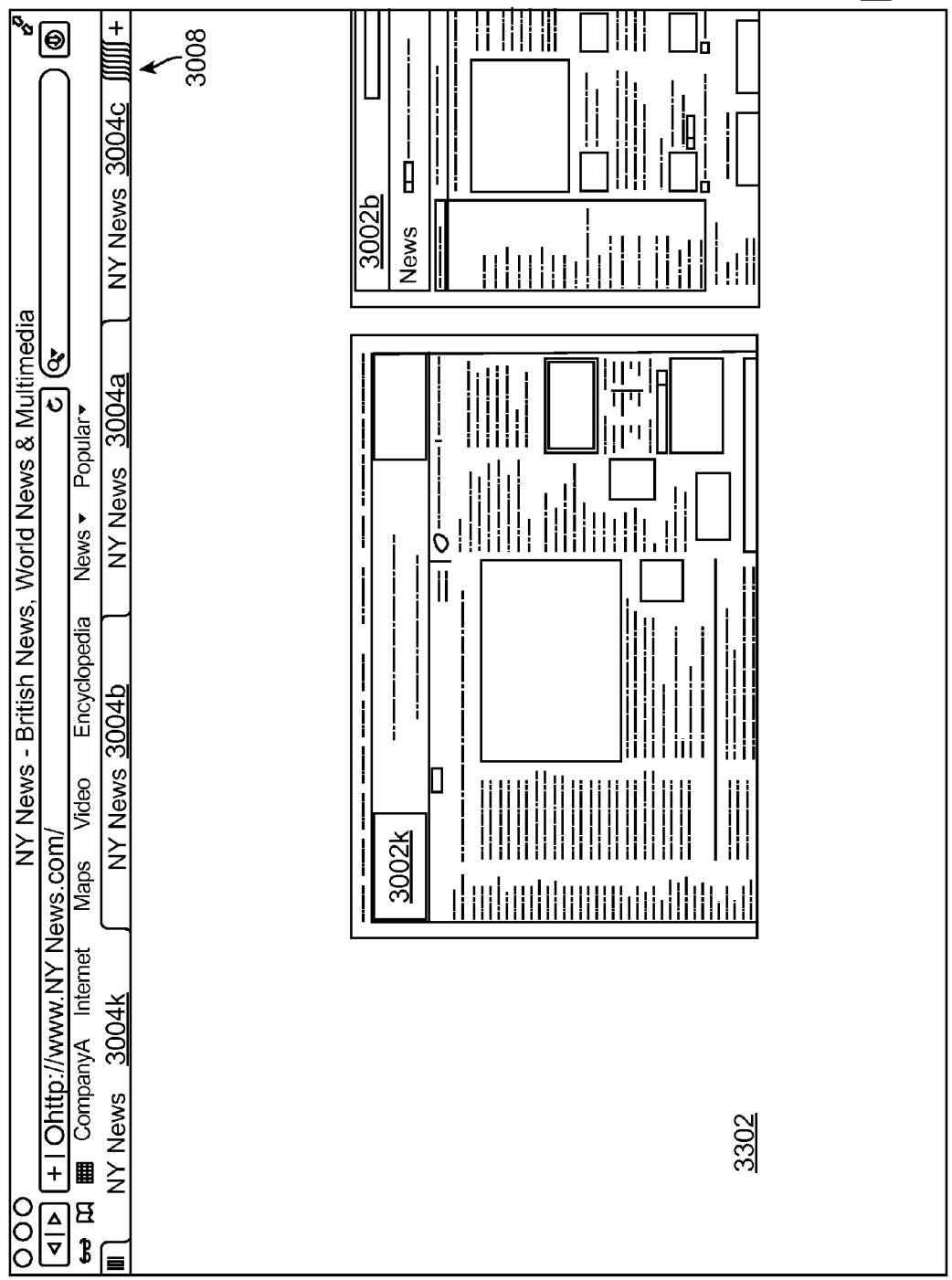

FIG. 33 illustrates a browser screen 3300 similar to screen 3200, except that in this case the array of pages 3002 has been scrolled all the way to the left end. Page 3002k, corresponding to the leftmost tab 3004k, is near the center of page-display area 3302. The blank space to the left, where the next page would be expected to appear, is a cue that this is the left end of the array. (Again, scrolling can be end-limited to prevent a situation where no part of the array is visible.) In addition, tab 3004k is now drawn as the top tab in tab area 3006, and there are no tabs to the left (tab pile 3102 from FIGS. 31 and 32 is gone).

In some embodiments, when scrolling reaches the end of the array (e.g., as shown in FIGS. 32 and 33), an affordance may be provided to allow other operations to be invoked. For example, in the blank space to the left of page 3002k in FIG. 33 and/or to the right of page 3002z in FIG. 32, an icon can be provided that is operable to create a new tab, to initiate a web search, or to perform other operations. In some embodiments, multiple icons for invoking different operations can be provided, and a particular icon can appear at either or both ends of an array. In some embodiments, an icon is not used, and an action such as clicking or tapping in a blank space at the end of the array causes a new tab to be created.

Figure 34:
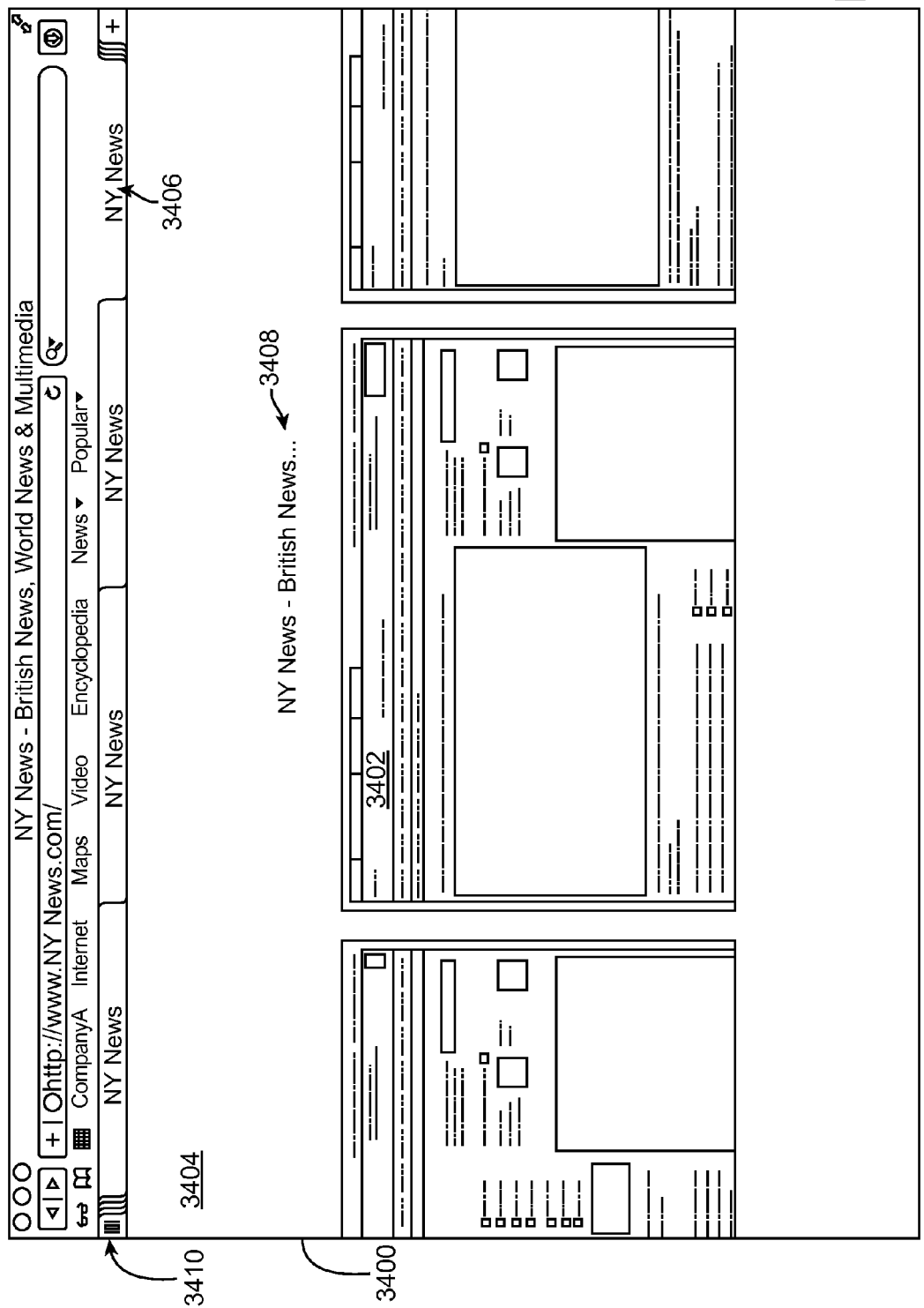
FIG. 34 illustrates a browser screen in array mode with additional page identification according to an embodiment of the present invention.

In the embodiment of FIGS. 29-33, the page is not always aligned directly under its tab (see, e.g., FIGS. 32 and 33). Accordingly, it may be helpful to provide further page identification. FIG. 34 illustrates a browser screen 3400 in array mode with additional page identification according to an embodiment of the present invention. A page 3402 is approximately centered in page display area 3404, and as in FIGS. 29-33, the corresponding tab 3406 appears as the top tab. Tab 3406, however, is near the right end of tab area 3410, while page 3402 is approximately centered. To facilitate identifying pages in the array, in this embodiment, a page title area 3408 appears above page 3402 within page display area 3404. The title displayed in page title area 3408 can be the same as the label in tab 3406 and can help the user associate the title with the correct tab. In some embodiments, the page title can move left and right with page 3402 when the array is scrolled, and other pages can also have titles that scroll with them. In some embodiments, display of titles is suppressed except for the page nearest the center; the title text in page title area 3408 can simply change as the pages move past it; transitions between titles can be animated, e.g., using effects such as fade-out and fade-in, dissolve, wipe or the like.

This embodiment illustrates one of many different arrangements of content items and different mechanisms for associating tabs with the content items shown n array mode can be employed. Features of the various embodiments can be combined as desired, and other features can be added.

Figure 35:
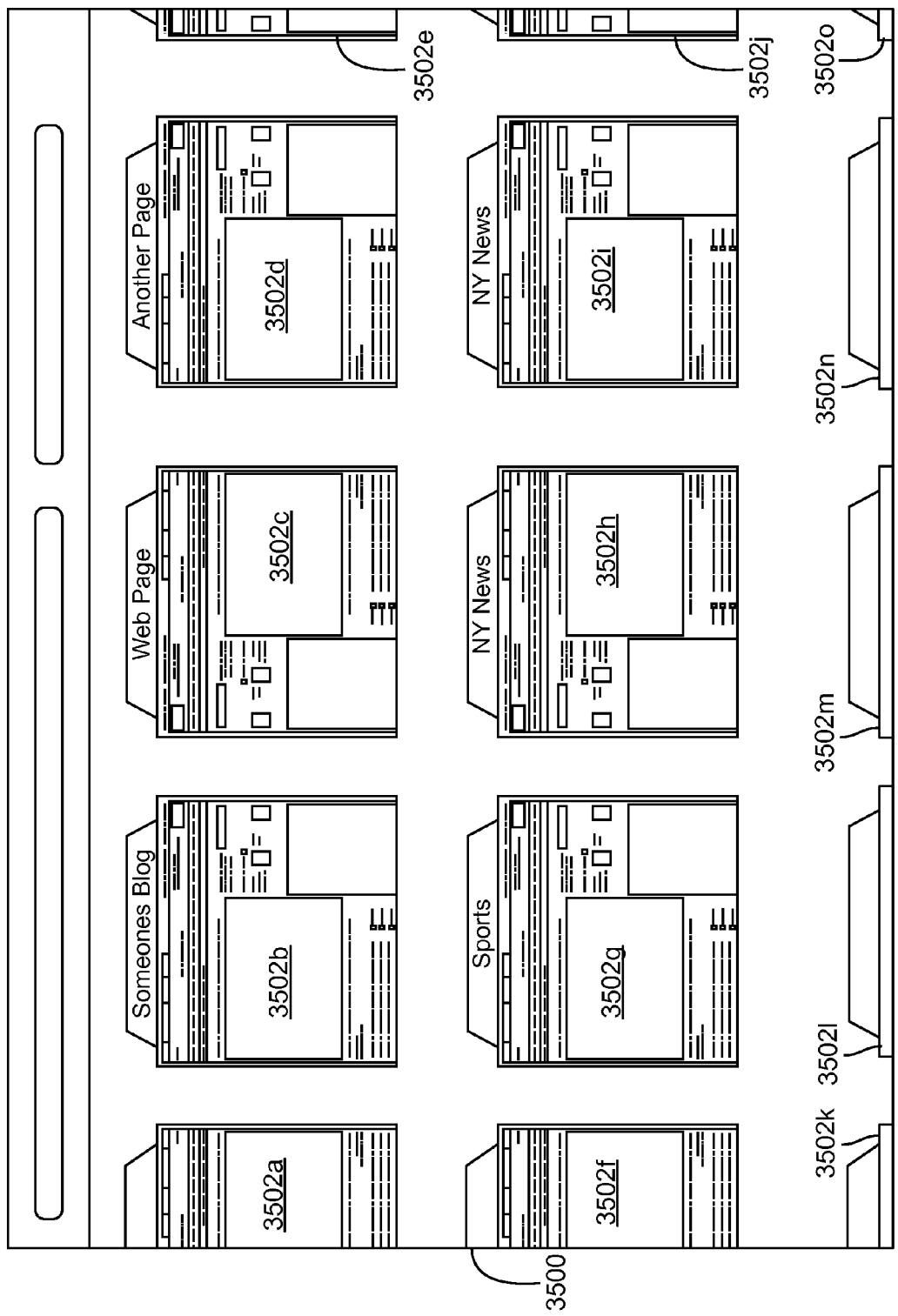
FIG. 35 illustrates a browser screen in array mode with pages arranged in a grid according to an embodiment of the present invention.

In the embodiments shown above, the tabs in array mode are arranged in a 1×N strip, where N is the number of open tabs. As noted above, this arrangement can bear an intuitive relationship to a single row of tabs but is not required. FIG. 35 illustrates a browser screen 3500 in array mode with pages 3502 arranged in a grid according to an embodiment of the present invention. Pages 3502a-j in two rows of the grid are fully visible, and a third row (pages 3502k-o) is partially visible. The grid can be mapped to the tabs of the full-frame mode in any manner desired, e.g., row-wise, column-wise or an arbitrary arrangement. Animated transitions can be used, e.g., to show the tabs fanning out from a tab bar in full-frame mode into the grid arrangement of the array mode. The grid arrangement can also be used, e.g., in a browser that can display multiple rows of tabs in full-frame mode; the rows of the grid can correspond to rows of the tabs. The grid need not be rectangular; different rows can have different numbers of pages.

While the invention has been described with respect to specific embodiments, one skilled in the art will recognize that numerous modifications are possible. For example, while embodiments described above make reference to web pages as the content items, other types of content items can also be the subject of browsing. Examples include document files (which may be stored locally on the user's computer or remotely), photos, media items, content streams (e.g., different TV channels and/or video-streaming channels and/or audio-streaming channels, with the array mode being used to preview channels and to select a channel to watch or listen to; the selected channel can be played in a full-frame mode).

A browser can include any computer program or other tool that allows a user to view and interact with content items. While browsers can be implemented as software executing on appropriate hardware, other implementations are possible, and a browser can be adapted for specific types of content items (e.g., web browser, document browser, etc.). The browser can support any number of open tabs, where each tab can be associated with a different content item, and the current content item for any one tab can be changed without affecting other tabs. The browser may (but need not) maintain a separate browsing history for each tab, e.g., to support forward and backward navigation on a per-tab basis. Some browsers may limit the number of tabs that can be open at a given time, e.g., due to memory or display constraints or the like. Tab indicators associated with the various tabs can be visible in full-frame mode, e.g., at, bottom, and/or sides of the page display area. It is not required that all tab indicators be visible at all times in either full-frame or array mode, and some browsers can have a full-frame mode in which the tab indicators are hidden.

Portions of the description may refer to particular user interfaces, such as touchscreen displays, other touch-sensitive surfaces, or point-and-click interfaces. Other embodiments may use different interfaces. For example, a user interface can be voice-based, with the user speaking instructions into a microphone or other audio input device and the device providing an audible response (e.g., using synthesized speech or pre-recorded audio clips) in addition to or instead of visual responses as described above. A combination of voice-based and visual interface elements can be used, and in some embodiments, multiple different types of interfaces can be supported, with the user having the option to select a desired interface, to use multiple interfaces in combination (e.g., reading information from the screen and speaking instructions) and/or to switch between different interfaces. Any desired form of user interaction with a device can be supported.

Certain embodiments make use of a pinch-swoop gesture as described above. In some embodiments, the pinch-swoop gesture can be incorporated into other aspects of user interface manipulation, not limited to a tabbed-browsing context. For example, in some embodiments, while a first user interface region is being displayed on a display device at a first scale factor, a touch-sensitive surface can detect multiple concurrent contacts (e.g., multiple fingers in contact with the surface). While continuing to detect at least one of the contacts, the computer system can detect a first gesture based on movement of the contacts relative to each other on the touch-sensitive surface (e.g., stage 1 of the pinch-swoop gesture described above). In response to this, the first user interface region can be displayed at a second scale factor lower than the first scale factor. While still continuing to detect at least one of the contacts, the computer system can then detect a second gesture based on movement of the contact(s) on the touch-sensitive surface (e.g., stage 2 of the pinch-swoop gesture described above). In response to this, a second user interface region (which can be any region that was not displayed prior to detecting the second gesture) can be displayed. The second user interface region can be displayed at the second scale factor until release of all the contacts from the surface is detected, at which point the second user interface region can be displayed at the first scale factor.

In embodiments described above, the user interface regions can correspond to content items in different tabs of a browser, but the gesture can be applied in other contexts as well. For example the first and second user interface regions can be windows in a multiple-document interface of an application, such as multiple documents open in a word processor or image viewer; windows in a tabbed document interface (e.g., tabbed web browsers as described above), or different application windows in an operating system.

In some embodiments, more than two user interface regions can be available, and the region that becomes the second region can be selected based on the direction of movement of the contact at a predefined time relative to an end of the second gesture. The predefined time can be, for example, when the end of the second gesture is detected, when release (e.g., lift off) of the contact is detected, or just prior to detecting release of the contact In some implementations the second user interface region can also be selected based on speed, acceleration, etc. The user interface regions can have, for navigational purposes, a defined spatial relationship (such as the array of tabs described above), and the relative location of the interface regions and/or the location of an interface region in relation to a location where the gesture is made or a time at which the gesture is made can also be used in selection.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
  at a computer system with a display:
    displaying, in a tab display area of a browser, a plurality of tabs that correspond to open pages, wherein the plurality of tabs include:
      a first tab that is a currently active tab that corresponds to a currently active page;
      a first pile of overlapping non-active tabs to the left of the currently active tab, wherein:
        in accordance with a determination that the first pile includes more than an upper limit of tabs, displaying the first pile includes displaying a first pile indicator that indicates that hidden tabs exist in the first pile without indicating how many hidden tabs exist in the first pile; and
        in accordance with a determination that the first pile does not include more than the upper limit of tabs, displaying the first pile includes displaying a first pile indicator that indicates the number of tabs in the first pile; and
      a second pile of overlapping non-active tabs to the right of the currently active tab;
    receiving an input that selects a second tab from the plurality of tabs as the currently active tab; and,
    in response to receiving the input that selects the second tab from the plurality of tabs as the currently active tab:
      changing the currently active tab from the first tab to the second tab;
      displaying the second tab as the currently active tab;
      displaying a second page that corresponds to the second tab as the currently active page;
      increasing the number of tabs in the first pile; and,
      decreasing the number of tabs in the second pile.

2. The method of claim 1, wherein the currently active tab is displayed on top of and between the first pile of overlapping non-active tabs and the second pile of overlapping non-active tabs.

3. The method of claim 2, wherein:
within the first pile of overlapping non-active tabs, tabs are ordered such that tabs closest to the currently active tab are nearest the top of the first pile, and
within the second pile of overlapping non-active tabs, tabs are ordered such that tabs closest to the currently active tab are nearest the top of the second pile.

4. The method of claim 1, including:
receiving an input that selects a rightmost tab in the tab display area as the currently active tab; and,
in response to receiving the input that selects the rightmost tab in the tab display area as the currently active tab:
changing the currently active tab to the rightmost tab in the tab display area;
displaying the rightmost tab as the currently active tab; and
ceasing to display the second pile of overlapping non-active tabs.

5. The method of claim 4, including:
in response to receiving the input that selects the rightmost tab in the tab display area as the currently active tab:
increasing a size of the first pile of overlapping non-active tabs.

6. A non-transitory computer readable storage medium encoded with instructions that, when executed by a computer system with a display, cause the computer system to:
display, in a tab display area of a browser, a plurality of tabs that correspond to open pages, wherein the plurality of tabs include:
a first tab that is a currently active tab that corresponds to a currently active page;
a first pile of overlapping non-active tabs to the left of the currently active tab, wherein:
in accordance with a determination that the first pile includes more than an upper limit of tabs, displaying the first pile includes displaying a first pile indicator that indicates that hidden tabs exist in the first pile without indicating how man hidden tabs exist in the first pile; and
in accordance with a determination that the first pile does not include more than the upper limit of tabs, displaying the first pile includes displaying a first pile indicator that indicates the number of tabs in the first pile; and
a second pile of overlapping non-active tabs to the right of the currently active tab;
receive an input that selects a second tab from the plurality of tabs as the currently active tab; and,
in response to receiving the input that selects the second tab from the plurality of tabs as the currently active tab:
change the currently active tab from the first tab to the second tab;
display the second tab as the currently active tab;
display a second page that corresponds to the second tab as the currently active page;
increase the number of tabs in the first pile; and,
decrease the number of tabs in the second pile.

7. The computer readable storage medium of claim 6, wherein the currently active tab is displayed on top of and between the first pile of overlapping non-active tabs and the second pile of overlapping non-active tabs.

8. The computer readable storage medium of claim 7, wherein:
within the first pile of overlapping non-active tabs, tabs are ordered such that tabs closest to the currently active tab are nearest the top of the first pile, and
within the second pile of overlapping non-active tabs, tabs are ordered such that tabs closest to the currently active tab are nearest the top of the second pile.

9. The computer readable storage medium of claim 6, including instructions that, when executed by the computer system with the display, cause the computer system to:
receive an input that selects a rightmost tab in the tab display area as the currently active tab; and,
in response to receiving the input that selects the rightmost tab in the tab display area as the currently active tab:
change the currently active tab to the rightmost tab in the tab display area;
display the rightmost tab as the currently active tab; and
cease to display the second pile of overlapping non-active tabs.

10. The computer readable storage medium of claim 9, including instructions that, when executed by the computer system with the display, cause the computer system to:
in response to receiving the input that selects the rightmost tab in the tab display area as the currently active tab:
increase a size of the first pile of overlapping non-active tabs.

11. A computer system, comprising:
a display;
one or more processors;
memory; and
one or more programs, wherein the one or more programs are stored in the memory and
configured to be executed by the one or more processors, the one or more programs including instructions for:
displaying, in a tab display area of a browser, a plurality of tabs that correspond to open pages, wherein the plurality of tabs include:
a first tab that is a currently active tab that corresponds to a currently active page;
a first pile of overlapping non-active tabs to the left of the currently active tab, wherein:
in accordance with a determination that the first pile includes more than an upper limit of tabs, displaying the first pile includes displaying a first pile indicator that indicates that hidden tabs exist in the first pile without indicating how many hidden tabs exist in the first pile; and
in accordance with a determination that the first pile does not include more than the upper limit of tabs, displaying the first pile includes displaying a first pile indicator that indicates the number of tabs in the first pile; and
a second pile of overlapping non-active tabs to the right of the currently active tab;
receiving an input that selects a second tab from the plurality of tabs as the currently active tab; and,
in response to receiving the input that selects the second tab from the plurality of tabs as the currently active tab:
changing the currently active tab from the first tab to the second tab;
displaying the second tab as the currently active tab;
displaying a second page that corresponds to the second tab as the currently active page;
increasing the number of tabs in the first pile; and,
decreasing the number of tabs in the second pile.

12. The computer system of claim 11, wherein the currently active tab is displayed on top of and between the first pile of overlapping non-active tabs and the second pile of overlapping non-active tabs.

13. The computer system of claim 12, wherein:
within the first pile of overlapping non-active tabs, tabs are ordered such that tabs closest to the currently active tab are nearest the top of the first pile, and
within the second pile of overlapping non-active tabs, tabs are ordered such that tabs closest to the currently active tab are nearest the top of the second pile.

14. The computer system of claim 11, including instructions for:
receiving an input that selects a rightmost tab in the tab display area as the currently active tab; and,
in response to receiving the input that selects the rightmost tab in the tab display area as the currently active tab:
changing the currently active tab to the rightmost tab in the tab display area;
displaying the rightmost tab as the currently active tab; and
ceasing to display the second pile of overlapping non-active tabs.

15. The computer system of claim 14, including:
in response to receiving the input that selects the rightmost tab in the tab display area as the currently active tab:
increasing a size of the first pile of overlapping non-active tabs.

\* \* \* \* \*

UNITED STATES PATENT AND TRADEMARK OFFICE
CERTIFICATE OF CORRECTION

| | | |
|---|---|---|
| PATENT NO. | : 9,477,642 B2 | |
| APPLICATION NO. | : 13/750572 | |
| DATED | : October 25, 2016 | |
| INVENTOR(S) | : Decker et al. | |

It is certified that error appears in the above-identified patent and that said Letters Patent is hereby corrected as shown below:

In the claims,

Claim 6, col. 27, line 44, delete "how man hidden" and insert --how many hidden--.

Signed and Sealed this
Twentieth Day of December, 2016

Michelle K. Lee
*Director of the United States Patent and Trademark Office*